United States Patent
Yajima et al.

(10) Patent No.: US 10,873,591 B2
(45) Date of Patent: *Dec. 22, 2020

(54) DEVICE AND METHOD FOR DETECTING ATTACK IN NETWORK

(71) Applicant: FUJITSU LIMITED, Kawasaki (JP)

(72) Inventors: Jun Yajima, Kawasaki (JP); Takayuki Hasebe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 113 days.

This patent is subject to a terminal disclaimer.

(21) Appl. No.: 16/249,973

(22) Filed: Jan. 17, 2019

(65) Prior Publication Data

US 2019/0230101 A1 Jul. 25, 2019

(30) Foreign Application Priority Data

Jan. 19, 2018 (JP) .................................. 2018-007232

(51) Int. Cl.
*H04L 29/06* (2006.01)
*H04L 12/26* (2006.01)
(Continued)

(52) U.S. Cl.
CPC .......... *H04L 63/1416* (2013.01); *G06F 21/55* (2013.01); *H04L 12/40* (2013.01);
(Continued)

(58) Field of Classification Search
CPC ............. H04L 63/1416; H04L 12/4625; H04L 63/1441; H04L 43/04; H04L 12/40;
(Continued)

(56) References Cited

U.S. PATENT DOCUMENTS

2008/0291915 A1 11/2008 Foschiano
2009/0044276 A1 2/2009 Abdel-Aziz et al.
(Continued)

FOREIGN PATENT DOCUMENTS

JP  2012109666  6/2012
JP  2014146868  8/2014
(Continued)

OTHER PUBLICATIONS

USPTO—Non-Final Office Action for U.S. Appl. No. 16/001,754 dated Mar. 12, 2020.
(Continued)

*Primary Examiner* — Joseph P Hirl
*Assistant Examiner* — Ka Shan Choy
(74) *Attorney, Agent, or Firm* — Fujitsu Patent Center

(57) ABSTRACT

An attack detection device includes: a receiver configured to receive a massage that includes target identification information transmitted in a network; and a processor. The processor predicts a number of massages to be received by the receiver in a specified monitor period based on a transmission cycle so as to generate a predicted value. The processor counts a number of massages received by the receiver in the monitor period so as to generate a count value. When the count value is larger than the predicted value and smaller than or equal to a reference value that is obtained by adding an early-arrival acceptable value to the predicted value, the processor decides whether the network has been attacked according to a result of a comparison between the predicted value and the count value after an early-arrival grace period corresponding to the early-arrival acceptable value elapses.

14 Claims, 25 Drawing Sheets

(51) Int. Cl.
   *G06F 21/55*  (2013.01)
   *H04L 12/40*  (2006.01)
   *H04L 12/46*  (2006.01)
(52) U.S. Cl.
   CPC .......... *H04L 12/4625* (2013.01); *H04L 43/04* (2013.01); *H04L 43/16* (2013.01); *H04L 63/1441* (2013.01); *H04L 2012/40215* (2013.01)
(58) Field of Classification Search
   CPC .......... H04L 43/16; H04L 2012/40215; H04L 67/12; H04L 63/1425; H04L 43/0894; G06F 21/55; G06F 21/554
   See application file for complete search history.

(56) References Cited

U.S. PATENT DOCUMENTS

| | | | |
|---|---|---|---|
| 2012/0124221 | A1 | 5/2012 | Kondo et al. |
| 2014/0328352 | A1 | 11/2014 | Mabuchi et al. |
| 2015/0358351 | A1 | 12/2015 | Otsuka et al. |
| 2016/0205194 | A1 | 7/2016 | Kishikawa et al. |
| 2017/0163680 | A1* | 6/2017 | Chen ................... H04L 63/1458 |
| 2017/0315523 | A1* | 11/2017 | Cross ..................... G05B 17/02 |
| 2017/0359372 | A1* | 12/2017 | Ronen ................. H04L 63/1458 |

FOREIGN PATENT DOCUMENTS

| | | |
|---|---|---|
| WO | 2013094072 | 6/2013 |
| WO | 2015-170451 | 11/2015 |

OTHER PUBLICATIONS

USPTO—Notice of Allowance for U.S. Appl. No. 16/001,754 dated Jul. 20, 2020 [allowed].

USPTO—Notice of Allowance for U.S. Appl. No. 16/001,754 dated Sep. 30, 2020 [allowed].

USPTO—Notice of Allowance for U.S. Appl. No. 16/001,754 dated Oct. 15, 2020 [allowed].

Peter Waszecki, et al., "Automotive Electrical and Electronic Architecture Security via Distributed in-Vehicle Traffic Monitoring", IEE Transactions on Computer-Aided Design of Integrated Circuits and Systems, vol. 36, No. 11, Nov. 2017, pp. 1790-1803, IEEE. [known by the Inventor dated Sep. 2, 2020].

* cited by examiner

| SOF | ARBITRATION | | CTRL | | | DATA | CRC | | ACK | | EOF |
|---|---|---|---|---|---|---|---|---|---|---|---|
| | ID | RTR | IDE | RES | DLC | | CRC SEQ | CRC DEL | ACK SLOT | ACK DEL | |
| 1 | 11 | 1 | 1 | 1 | 4 | 0–64 | 15 | 1 | 1 | 1 | 7 |

F1

| SOF | ARBITRATION | | | | CTRL | | | | DATA | CRC | | ACK | | EOF |
|---|---|---|---|---|---|---|---|---|---|---|---|---|---|---|
| | ID BASE | SRR | IDE | ID EXT | RTR | r1 | RES | DLC | | CRC SEQ | CRC DEL | ACK SLOT | ACK DEL | |
| 1 | 11 | 1 | 1 | 18 | 1 | 1 | 1 | 4 | 0–64 | 15 | 1 | 1 | 1 | 7 |

F2

F I G. 2

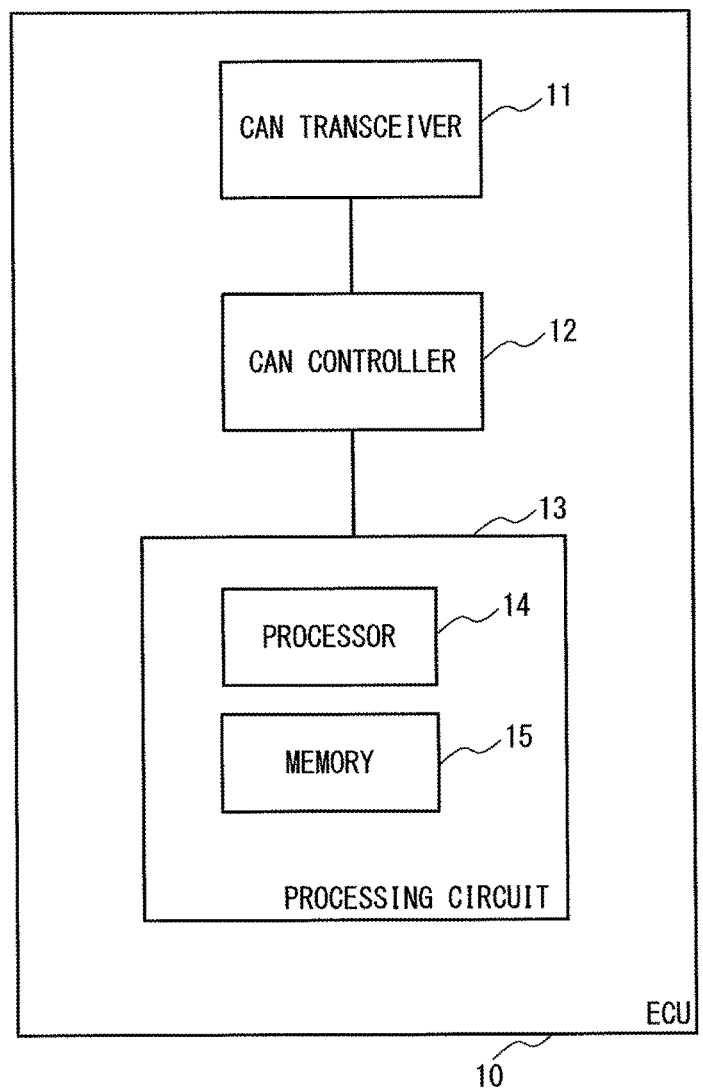
F I G. 5

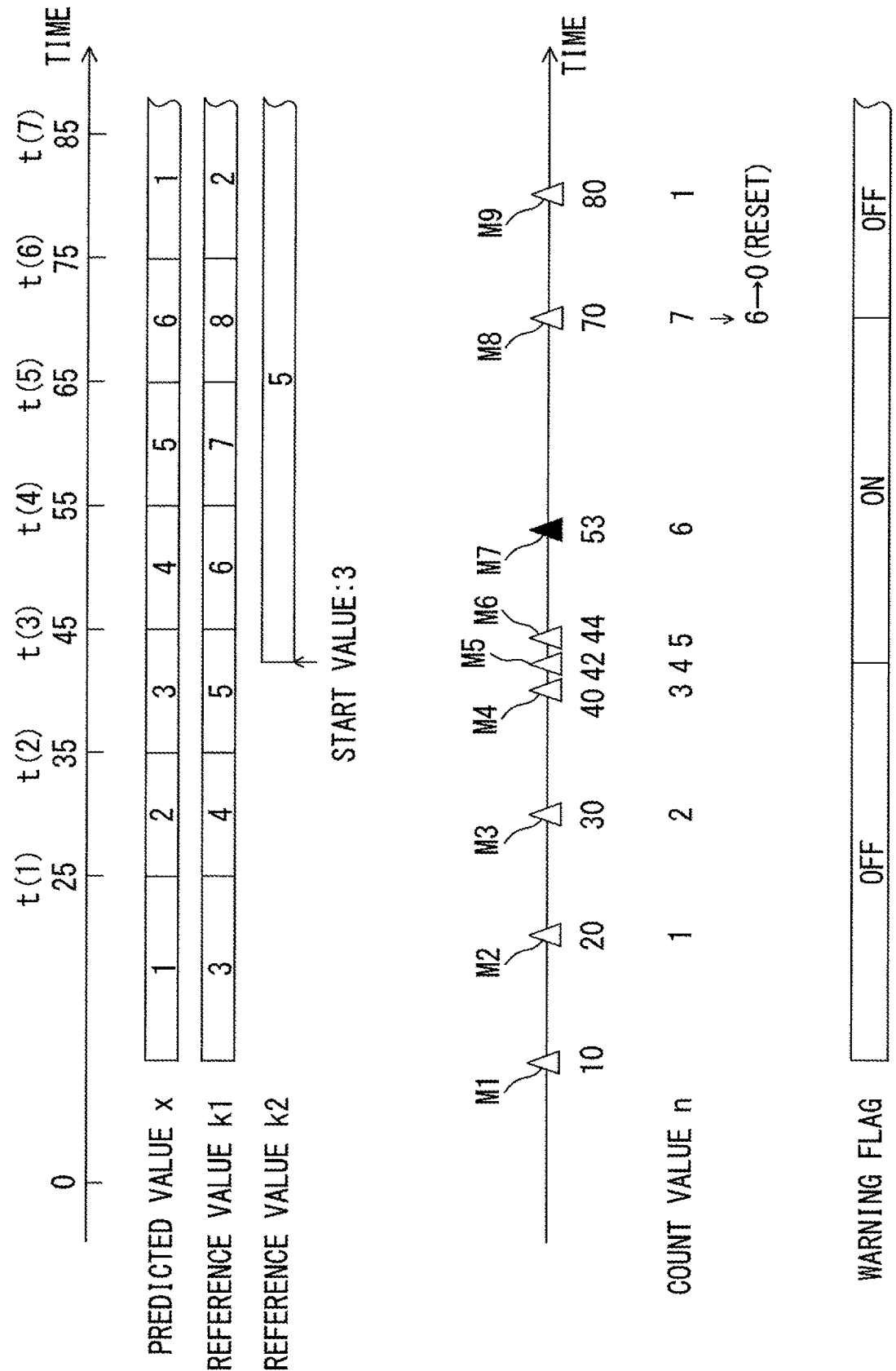
F I G. 24

DEVICE AND METHOD FOR DETECTING ATTACK IN NETWORK

CROSS-REFERENCE TO RELATED APPLICATION

This application is based upon and claims the benefit of priority of the prior Japanese Patent Application No. 2018-007232, filed on Jan. 19, 2018, the entire contents of which are incorporated herein by reference.

FIELD

The embodiments discussed herein are related to a device and a method for detecting an attack in a network.

BACKGROUND

A network technology called a CAN (Controller Area Network) may be used in an on-board network of a vehicle. An ECU (Electronic Control Unit) is implemented in each node in a network using the CAN.

Identification information (ID) is attached to a message transmitted from an ECU. This message is broadcast to ECUs in the network. Here, each ECU knows an ID of a message to be obtained by itself. Each ECU checks an ID of a received message so as to obtain a message to be obtained.

In a CAN system having the configuration described above, a malicious third party may take control of an ECU, and a malicious message may be output from the ECU so that an attack occurs in the system. For example, an ID used in the CAN system is attached to the malicious message. Then, an ECU that receives the message may perform an unintended process.

In many CAN systems, an ECU outputs a message in a specified cycle. Thus, when a cycle in which a message is output is known, each ECU can detect a malicious message by comparing a scheduled arrival time of a message with an actual arrival time of the message.

A method has been proposed that verifies, when a data frame is received that does not comply with a specified rule related to a transmission cycle of a data frame, a specified identifier in the received data frame, so as to decide whether the received data frame is transmitted for an attack (for example, International Publication Pamphlet No. WO 2015/170451).

In the CAN system described above, a normal message may be transmitted prior to a scheduled time. That is, the normal message may arrive at each ECU prior to a scheduled arrival time. In this case, a malicious message may be incapable of being appropriately monitored using a method wherein a scheduled arrival time of a message is compared with an actual arrival time of the message. For example, a normal message transmitted prior to a scheduled time may be determined to be a malicious message. Accordingly, in an environment where a message may be transmitted at a timing prior to a scheduled time, the accuracy in detection of an attack could be decreased.

SUMMARY

According to an aspect of the present invention, an attack detection device includes: a receiver configured to receive a massage that includes target identification information transmitted in a network; and a processor configured to predict a number of massages to be received by the receiver in a specified monitor period based on a transmission cycle corresponding to the target identification information so as to generate a predicted value, count a number of massages received by the receiver in the specified monitor period so as to generate a count value, and decide whether the network has been attacked according to the predicted value, a reference value that is obtained by adding an early-arrival acceptable value specified in advance to the predicted value, and the count value. When the count value is larger than the predicted value and smaller than or equal to the reference value, the processor decides whether the network has been attacked according to a result of a comparison between the predicted value and the count value after an early-arrival grace period corresponding to the early-arrival acceptable value elapses.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates examples of formats of frames used to transmit a message;

FIG. 5 illustrates an example of a hardware configuration of an ECU in which the attack detection device is implemented;

FIGS. 23-25 illustrate examples of processes of an attack detection device.

DESCRIPTION OF EMBODIMENTS

Figure 1:
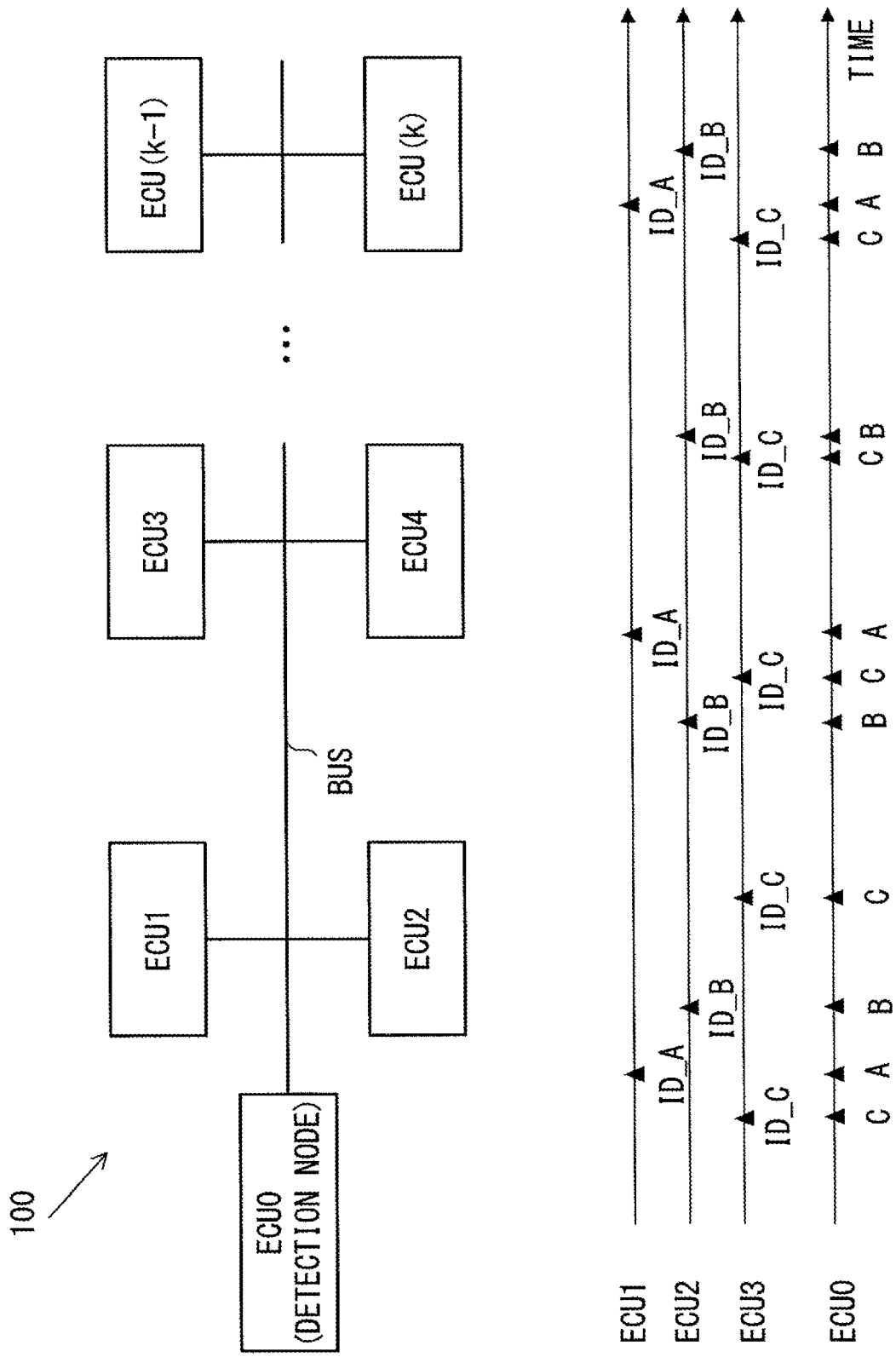
FIG. 1 illustrates an example of a network in which an attack detection device is implemented.

FIG. 1 illustrates an example of a network in which an attack detection device is implemented according to embodiments of the present invention. A network 100 illustrated in FIG. 1 includes a plurality of ECUs (ECU 0 to ECU k). The plurality of ECUs are connected to one another through a bus. In this example, the plurality of ECUs configure a CAN (controller area network) system.

Each ECU can transmit a message through a bus. This message is broadcast to all of the ECUs in the network 100. In this case, the message also arrives at the source node of the message. Identification information (ID) is attached to each message. Here, each ECU knows an ID of a message to be obtained by itself. Each ECU checks an ID of a received message so as to obtain a message to be obtained. Note that each ECU is an example of a "communication device".

In the network 100 described above, an attack detection device is implemented in one of the plurality of ECUs. In the example illustrated in FIG. 1, it is assumed that an attack detection device is implemented in the ECU 0. The attack detection device detects an attack in the network 100. In the description below, a malicious message may be referred to as an "attack massage".

At least one of the ECU 1 to the ECU k includes a function that transmits messages in a specified cycle. In the example illustrated in FIG. 1, the ECU 1 transmits messages including identification information ID_A in a specified cycle, the ECU 2 transmits messages including identification information ID_B in a specified cycle, and the ECU 3 transmits messages including identification information ID_C in a specified cycle. The transmission cycle of a message is determined for each ID in advance. For example, messages to which ID=0x123 is attached are transmitted at 10-ms intervals, and messages to which ID=0x456 is attached are transmitted at 20-ms intervals.

In an on-board network of a vehicle, a plurality of ECUs are used to control the vehicle. For example, a message to which ID=0x123 is attached transmits data that represents an accelerator position, and a message to which ID=0x456 is attached transmits data that represents an angle of a depressed brake pedal.

As described above, each message transmitted in the network 100 is broadcast. Thus, every message arrives at all of the ECUs. The timing chart of FIG. 1 indicates a state in which messages transmitted from the ECU 1 to ECU 3 arrive at the ECU 0.

FIG. 2 illustrates examples of formats of frames used to transmit a message. F1 represents an example of a format of a frame of a standard configuration, and F2 represents an example of a format of a frame of an extended configuration.

The frame F1 of a standard configuration includes an SOF (start of frame), an arbitration field, a control field, a data field, a CRC field, an ACK field, and an EOF (end of frame). The arbitration field includes an ID and an RTR (remote transmission request). The ID represents identification information used to identify a message. The control field includes an IDE (identifier extension), a reservation bit, and a DLC (data length code). The CRC field includes a CRC sequence and a CRC delimiter. The ACK field includes an ACK slot and an ACK delimiter. The value given to each information element in FIG. 2 represents a bit length. For example, the length of the ID is 11 bits, and the length of the data field is a variable between 0 and 64 bits.

As in the case of the frame F1 of a standard configuration, the frame F2 of an extended configuration also includes an SOF, an arbitration field, a control field, a data field, a CRC field, an ACK field, and an EOF. However, in the extended configuration, identification information is represented with a greater number of bits.

In the following description, it is assumed that a message is transmitted using a frame of a standard configuration. However, an attack detection method according to the embodiments of the present invention is also applicable when a message is transmitted using a frame of an extended configuration. Further, it is also applicable to a standard that is called CAN-FD.

Figure 3A:
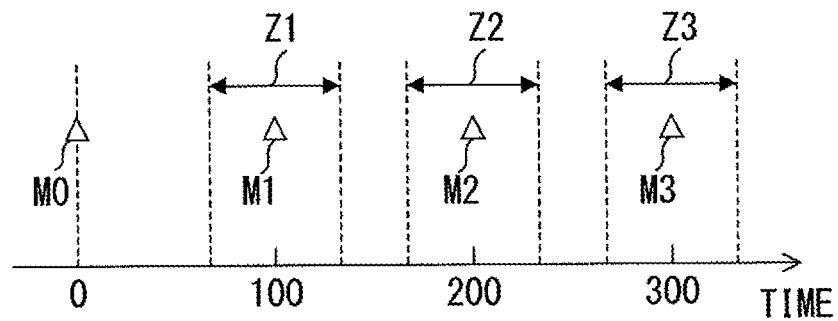
FIGS. 3A and 3B illustrate examples of an attack detection method.
Figure 3B:
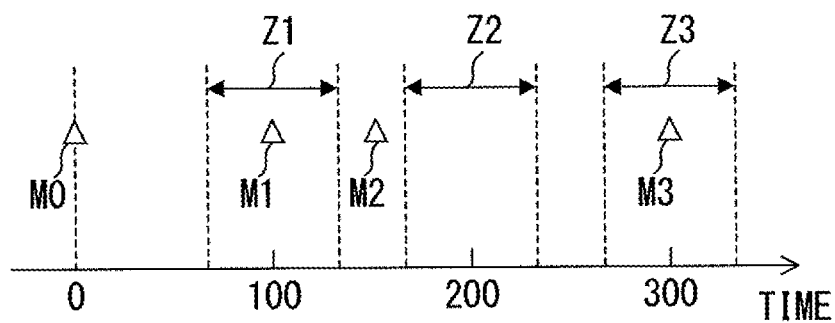

FIGS. 3A and 3B illustrate examples of an attack detection method. In this example, messages including an ID of a detection target are transmitted at 100-ms intervals. When an attack detection device receives a reference message M0, the attack detection device sets a monitor section. The acceptable range for each monitor section is ±40 ms. In other words, with respect to the reception time of the reference message M0, a monitor section Z1 is set to 100±40 ms, a monitor section Z2 is set to 200±40 ms, and a monitor section Z3 is set to 300±40 ms.

In the example illustrated in FIG. 3A, messages M1, M2, and M3 that follow the reference message M0 are respectively detected in the monitor sections Z1, Z2, and Z3. In this case, the attack detection device decides that all of the messages M1 to M3 are normal messages. An ID of a detection target is attached to each of the messages M1 to M3.

In the example illustrated in FIG. 3B, the message M2 is transmitted prior to a scheduled time and detected outside the monitor section Z2. In this case, the attack detection device decides that the message M2 is an attack message. In particular, when a message is transmitted prior to a scheduled time, the attack detection device could decide that the network has been attacked in spite of receiving a normal message. A situation in which a message arrives at the attack detection device prior to a scheduled time may hereinafter be referred to as an "early arrival". Meanwhile, a message that arrives at the attack detection device prior to a scheduled time may be referred to as an "early arriving message".

The attack detection device according to embodiments of the invention includes functions to solve or suppress the problems described above. In particular, the attack detection device according to embodiments of the invention includes functions to suppress erroneous detection that could be caused by a message to be periodically transmitted being transmitted prior to a scheduled time, so as to enhance the accuracy in detection of attacks. Attack detection according to embodiments can address not only early arrival within one cycle but also early arrival exceeding one cycle.

Figure 4:
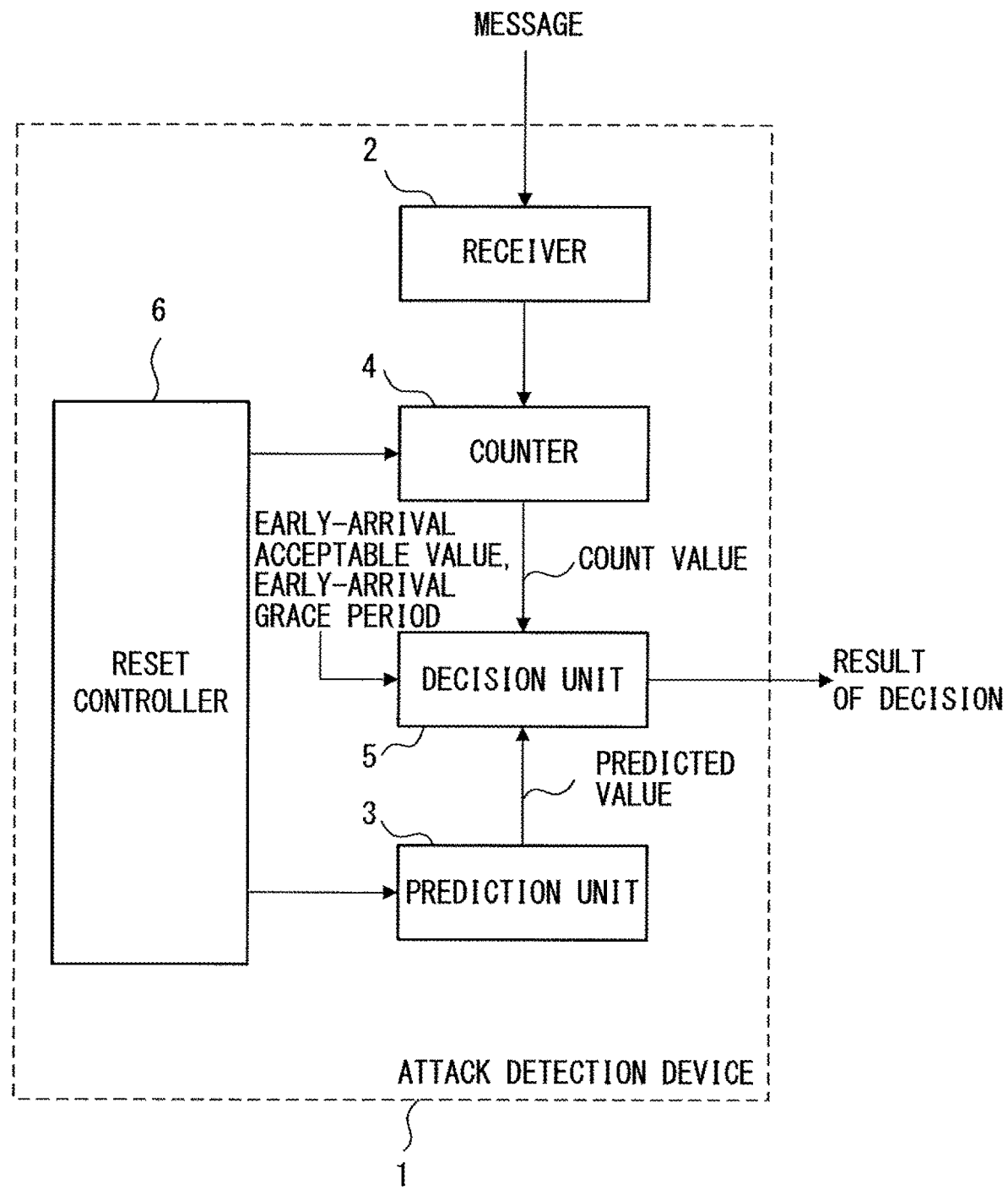
FIG. 4 illustrates an example of an attack detection device according to embodiments of the present invention.

FIG. 4 illustrates an example of the attack detection device according to the embodiments of the present invention. As illustrated in FIG. 4, an attack detection device 1 includes a receiver 2, a prediction unit 3, a counter 4, a decision unit 5, and a reset controller 6. The receiver 2 receives a message periodically transmitted from an ECU implemented in the network 100. The attack detection device 1 can detect a reception time of a message for each ID attached to a message. The reception time of a message is detected, for example, using a timer (not illustrated) implemented in the attack detection device 1.

The prediction unit 3 sets a monitor period for a detection target ID. The prediction unit 3 predicts, according to a transmission cycle for the detection target ID, the number of messages estimated to be received by the receiver 2 within the monitor period. The counter 4 counts the number of messages actually received by the receiver 2 within the monitor period. However, a count value obtained by the counter 4 may be corrected not to include the number of attack messages.

The decision unit 5 decides whether the network 100 has been attacked according to a predicted value obtained by the prediction unit 3, a reference value obtained by adding an early-arrival acceptable value specified in advance to the predicted value, and a count value obtained by the counter 4. When, for example, the decision unit 5 detects that the count value is larger than the predicted value and smaller than or equal to the reference value, the decision unit 5 decides whether the network 100 has been attacked according to a result of a comparison between the count value and the predicted value after an early-arrival grace period corresponding to the early-arrival acceptable value elapses. During the period up to the end of the grace period, it is decided whether the network 100 has been attacked according to whether the count value has exceeded the reference value.

The early-arrival acceptable value is used to prevent a normal message from being determined to be an attack message when the normal message arrives at the attack detection device 1 prior to a scheduled arrival time. In one example, the early-arrival acceptable value represents the largest number of early arriving messages acceptable as normal messages.

When, for example, an attack message is input to the network 100 in addition to normal messages transmitted in a specified cycle, the number of messages received by the attack detection device 1 exceeds the predicted value. However, even in a case where an attack message is not input, when a normal message arrives at the attack detection device 1 prior to a scheduled arrival time, the number of received messages temporarily exceeds the predicted value. Accordingly, to enhance the accuracy in detection of attacks, attack messages need to be distinguished from early arriving messages.

When the number of received messages has temporarily exceeded the predicted value due to an early arrival of a message, received messages are considered to arrive temporarily at a reduced frequency. Accordingly, in the absence of an attack message, even when the count value temporarily exceeds the predicted value due to an early arriving message, the count value is estimated to become equal to the predicted value in due course. In particular, in a case where e messages arrive prior to a scheduled arrival time, when a time period that is at least e times as long as the transmission cycle of normal messages elapses, the count value is estimated to becomes equal to the predicted value again.

Accordingly, when the count value is larger than the predicted value and equal to or smaller than "predicted value plus early-arrival acceptable value", the decision unit 5 changes a warning flag from OFF state to ON state. After an early-arrival grace period corresponding to the early-arrival acceptable value elapses, the decision unit 5 decides whether the network 100 has been attacked according to a result of a comparison between the count value and the predicted value. When a result of the comparison indicates that the count value is equal to or smaller than the predicted value, the change in the warning flag is assumed to have been caused by an early arriving message, and hence the decision unit 5 does not decide that the network 100 has been attacked. Meanwhile, when the count value remains larger than the predicted value even after the early-arrival grace period elapses, the change in the warning flag is assumed to have been caused by an attack message, and hence the decision unit 5 decides that the network 100 has been attacked. It should be noted that the early-arrival grace period corresponds to a time period extending from a moment at which the count value exceeded the predicted value due to an early arriving message to a moment at which the count value is estimated to become equal to the predicted value again.

When a specified condition is satisfied, the reset controller 6 resets the predicted value obtained by the prediction unit 3 and the count value obtained by the counter 4. In this case, the reset controller 6 may set a next monitor period.

FIG. 5 illustrates an example of a hardware configuration of an ECU in which the attack detection device 1 is implemented. In this example, an ECU 10 includes a CAN transceiver 11, a CAN controller 12, and a processing circuit 13. The processing circuit 13 includes a processor 14 and a memory 15.

The CAN transceiver 11 has a function that transmits and receives the frames illustrated in FIG. 2. The CAN controller 12 extracts data from a frame received by the CAN transceiver 11 and detects a reception time for this frame. The CAN controller 12 may perform a CRC check for the received frame. Further, the CAN controller 12 may store data in a transmission frame. The processor 14 detects an attack by executing a program stored in the memory 15. In this case, a program that describes functions of the prediction unit 3, the counter 4, the decision unit 5, and the reset controller 6 illustrated in FIG. 4 is stored in the memory 15. Then, the processor 14 provides the functions of the prediction unit 3, the counter 4, the decision unit 5, and the reset controller 6 by executing this program. The receiver 2 illustrated in FIG. 4 may be implemented by, for example, the CAN transceiver 11.

Figure 6:
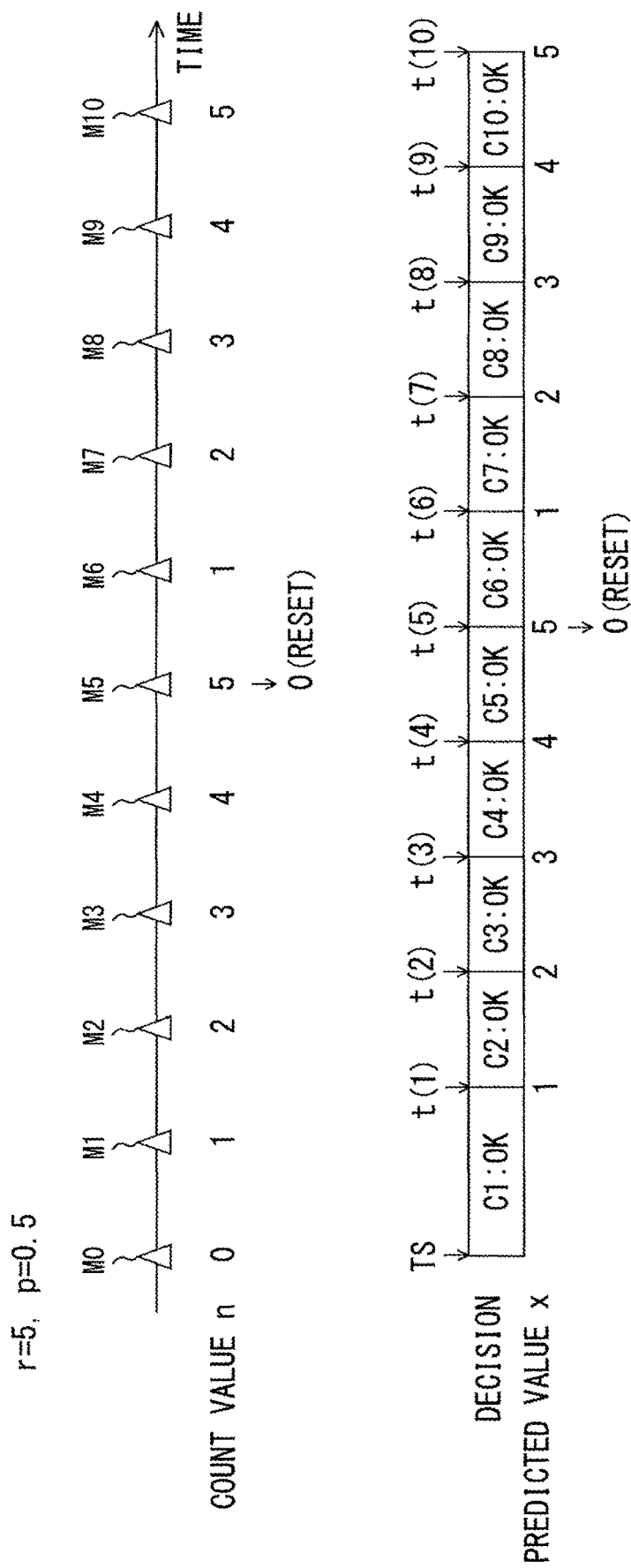
FIG. 6 illustrates an example of an operation of an attack detection device.

FIG. 6 illustrates an example of an operation of the attack detection device 1. The attack detection device 1 is implemented in the ECU0 depicted in FIG. 1 and detects a malicious message (i.e., attack message) that attacks the network 100. In this example, a message to which a detection target ID has been attached is designed to be transmitted in a specified cycle. The following communication is performed in the network 100.

(1) A message will not be lost.
(2) When transmission of a message is delayed, the total number of messages will be recovered because the message is transmitted at a later time.
(3) When a message is transmitted prior to a scheduled time, the total number of messages will be recovered because the message has already been transmitted and would not be transmitted again.

A "message" hereinafter represents a message to which a detection target ID has been attached, unless otherwise noted. The triangle symbol "Δ" represents a timing at which a normal message arrives at the attack detection device 1 via the receiver 2.

In FIG. 6, a count value n represents the number of messages received by the receiver 2 and is counted by the counter 4. A predicted value x represents the number of messages estimated to be received by the receiver 2 during a monitor period and is calculated by the prediction unit 3.

The prediction unit 3 sets monitor periods based on a transmission cycle TC of messages. The monitor periods are set with respect to a reception time of a reference message. Assume, for example, that a reference message M0 arrives at the attack detection device 1 at time TS. In this case, the monitor periods are set with respect to time TS. The monitor period includes one or more counting periods. For example, an initial monitor period TS-t(1) includes a counting period C1. A monitor period TS-t(2) includes counting periods C1 and C2. A monitor period TS-t(5) includes counting periods C1-C5. The length of each counting period is the same as that of the transmission cycle TC. However, the length of the initial counting period C1 is obtained by multiplying the transmission cycle TC by "1+p". A timing parameter p is a real number that is larger than zero and smaller than 1. For example, the timing parameter p is determined in a manner such that when messages are transmitted in the transmission cycle TC without delay, the receiver 2 receives a corresponding message at the center of each counting period. In this case, the value of the timing parameter p is 0.5.

A monitor period is set with reference to the reception time of the reference message M0. Assume, for example, that the reference message M0 arrives at the attack detection device 1 at time TS. In this case, the end time of a monitor period, i.e., end time t(i), is expressed by the following formula.

$$t(i)=TS+(i+p)*TC$$

i is a natural number for identifying each monitor period. Accordingly, for example, the end time of an initial monitor period, i.e., end time t(1), is represented as "TS+1.5 TC", and the end time of a second monitor period, i.e., end time t(2), is represented as "TS+2.5 TC". Note that p is 0.5.

In addition, the prediction unit 3 predicts the number of messages estimated to be received by the receiver 2 during a monitor period. In particular, a predicted value x is generated for each monitor period. In this example, "1" is calculated as a predicted value x for the initial monitor period (a period from TS to t(1)), and "2" is calculated as a predicted value x for the second monitor period (a period from TS to t (2)). Similarly, "i" is calculated as a predicted value x for an i-th monitor period (a period from TS to t(i)).

Every time a message arrives at the attack detection device 1, the decision unit 5 decides whether an attack message has been input to the network 100. The following descriptions are based on the assumption that detection target IDs have been attached to messages (including attack messages) that arrive at the attack detection device 1.

When a message M1 arrives at the attack detection device 1, a count value n is incremented from zero to 1. At this moment, a predicted value x calculated by the prediction unit 3 is 1. The decision unit 5 compares the count value n with the predicted value x. Here, the count value n does not exceed the predicted value x. In this case, the decision unit 5 decides that the network 100 has not been attacked. The "OK" in FIG. 6 indicates that an attack is not detected.

When a message M2 arrives at the attack detection device 1, the count value n is incremented from 1 to 2. At this moment, the predicted value x calculated by the prediction unit 3 is 2. The decision unit 5 compares the count value n with the predicted value x. Here, the count value n does not exceed the predicted value x, and hence the decision unit 5 decides that the network 100 has not been attacked.

Similarly, every time a message arrives at the attack detection device 1, the decision unit 5 decides whether an attack message has been input to the network 100. However, a clock of each ECU has an error. If the errors are accumulated, the attack detection device 1 may be incapable of correctly counting the number of messages received during each monitor period. In this case, the attack detection device 1 may be incapable of correctly deciding whether the network 100 has been attacked. Accordingly, the decision unit 5 includes functions to periodically reset the predicted value x and the count value n so as to eliminate the accumulation of errors.

In particular, when the count value n becomes a specified threshold r or larger, the predicted value x and the count value n are reset. In the example depicted in FIG. 6, the threshold r is 5. When the count value n becomes the threshold r or larger, the count value n is initialized and thus becomes 0. The predicted value x is updated from "x" to "x−n". In the example depicted in FIG. 6, the predicted value x is updated from "5" to "zero". In some cases, however, the predicted value x may be updated to a nonzero value.

As described above, every time a message arrives at the attack detection device 1, the attack detection device 1 compares a count value n representing the number of messages received by the receiver 2 during a monitor period with a corresponding predicted value x. When the count value n is equal to or smaller than the predicted value x, the attack detection device 1 decides that the network 100 has not been attacked.

Figure 7:
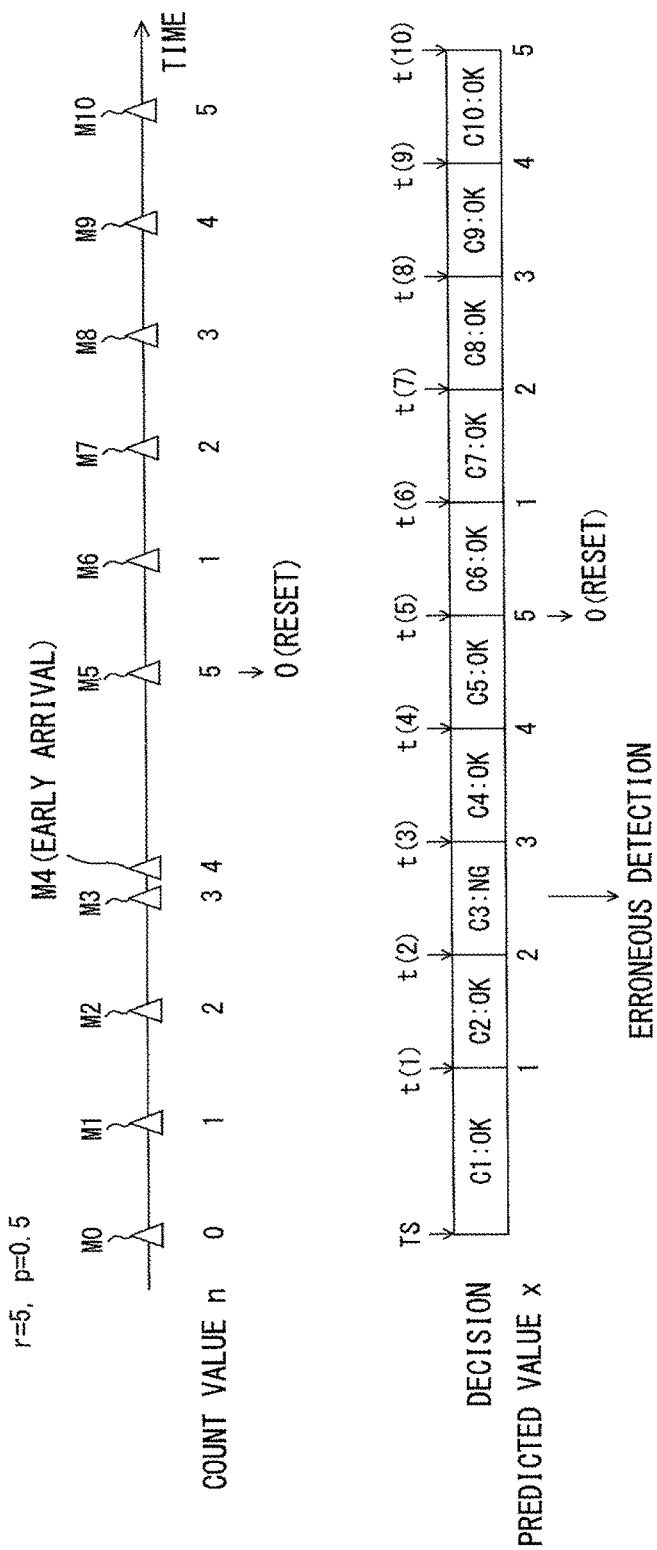
FIG. 7 illustrates an example of a problem that could occur when a message arrives early.

In the method described above, however, erroneous detection could occur when an early arriving message arrives at the attack detection device 1. In the example depicted in FIG. 7, for example, a message M4 arrives at the attack detection device 1 prior to a scheduled arrival time, and a count value n is incremented from 3 to 4 prior to time t(3). At this moment, the predicted value x is 3. Hence, the count value n is larger than the predicted value x. In this case, although messages M1-M4 are normal messages, the decision unit 5 decides that the network 100 has been attacked.

The attack detection device according to embodiments of the present invention includes functions to solve the problem described above. The following describes first to third embodiments of the invention.

First Embodiment

FIGS. 8-11 illustrate examples of operations of an attack detection method according to a first embodiment. The white triangle symbol "Δ" represents a timing at which a normal message arrives at the attack detection device 1. The black triangle symbol "▲" represents a timing at which an attack message arrives at the attack detection device 1. Upon receipt of a reference message M0, the attack detection device 1 starts a process of counting received messages. The reference message M0 is, for example, the first message that arrives the attack detection device 1 after an attack detection process has been started.

A monitor period includes one or more counting periods, as described above. For example, an initial monitor period includes a counting period C1. A second monitor period includes counting periods C1-C2. The length of each counting period is equal to the length of a transmission cycle TC of messages. However, the length of the initial counting period C1 is 1.5 times the length of the transmission cycle CT.

A predicted value x represents the number of messages anticipated to arrive at the attack detection device 1 during each monitor period and is calculated by the prediction unit 3. In other words, the predicted value x represents the number of messages anticipated to arrive at the attack detection device 1 by a time at which each counting period ends. When the count value n is reset, the predicted value x is also reset. In the resetting, however, the predicted value x is updated to "x−n".

A count value n represents the number of messages that have arrived at the attack detection device 1 and is counted by the counter 4. The count value n is reset when this value becomes equal to or greater than a threshold r. In this example, the threshold r is 5. In this example, however, in a case where a warning flag is in OFF state, the count value n is reset when this value becomes equal to or greater than the threshold r. In the resetting, the count value n is updated to zero.

Figure 8:
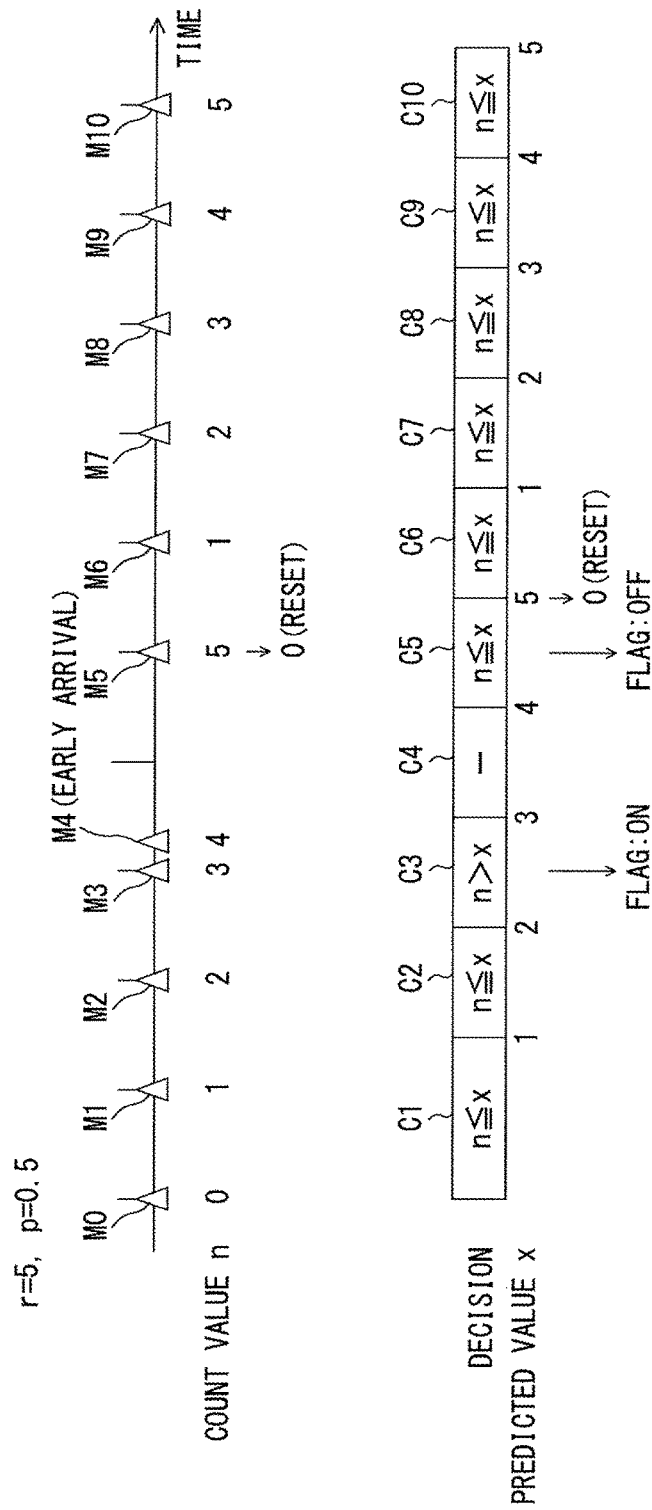
FIGS. 8-11 illustrate examples of operations of an attack detection method of a first embodiment.

In the example depicted in FIG. 8, an attack message is not present. However, a message M4 arrives at the attack detection device 1 prior to a scheduled arrival time. In particular, although the message M4 was estimated to arrive at a counting period C4, the message 4 actually arrives at a counting period C3. Note that a warning flag is initialized and thus set to OFF state when the attack detection process starts.

When a message M1 arrives at the attack detection device 1, a count value n is incremented from 0 to 1. The message M1 arrives at the attack detection device 1 within a counting period C1, and hence the predicted value x calculated by the prediction unit 3 is 1. The decision unit 5 compares the count value n with the predicted value x. At this moment, the count value n has not exceeded the predicted value x. In this case, the decision unit 5 decides that the network 100 has not been attacked.

When a message M2 arrives at the attack detection device 1, the count value n is incremented from 1 to 2. The message M2 arrives at the attack detection device 1 within a counting period C2, and hence the predicted value is 2. The decision unit 5 compares the count value n with the predicted value x. Also at this moment, the count value n has not exceeded the predicted value x. Hence, the decision unit 5 decides that the network 100 has not been attacked. Similarly, when a message M3 arrives at the attack detection device 1, the decision unit 5 decides that the network 100 has not been attacked.

When a message M4 arrives at the attack detection device 1, the count value n is incremented from 3 to 4. However, the message M4 arrives at the attack detection device 1 within a counting period C3, and hence the predicted value x is 3. Thus, the count value n is larger than the predicted value x. In response to this, the decision unit 5 checks the warning flag. At this moment, the warning flag is in OFF state. In this case, the decision unit 5 changes the warning flag from OFF state to ON state. However, the decision unit 5 does not decide that the network 100 has been attacked.

When a message M5 arrives at the attack detection device 1, the count value n is incremented from 4 to 5. The message M5 arrives at the attack detection device 1 within a counting period C5, and hence the predicted value x is 5. The decision unit 5 compares the count value n with the predicted value x. At this moment, the count value n has not exceeded the predicted value x. Accordingly, the decision unit 5 decides that the network 100 has not been attacked. The decision unit 5 also changes the warning flag from ON state to OFF state.

As described above, when a normal message early arrives at the attack detection device 1, the warning flag is changed from OFF state to ON state. That is, the attack detection device 1 decides that the network 100 could possibly have been attacked. At this moment, however, the attack detection device 1 does not decide whether a normal message has early arrived or whether an attack message has been input. The attack detection device 1 performs monitoring as to whether a next message arrives at a time near a scheduled arrival time. In the example depicted in FIG. 8, the next message (i.e., message M5) arrives at the attack detection device 1 at a time near the scheduled arrival time of the message. In this case, the predicted value x is incremented from 3 to 5 within a period from the time of arrival of the message M4 to the time of the arrival of the message M5. As a result, the count value n becomes equal to or smaller than the predicted value x, and the decision unit 5 decides that the network 100 has not been attacked. That is, the attack detection device 1 decides that "the warning flag has been set to ON state due to a normal message that has early arrived, not due to an attack message". Accordingly, the first embodiment allows erroneous detection that could be caused by an early arriving normal message to be avoided or suppressed.

Figure 9:
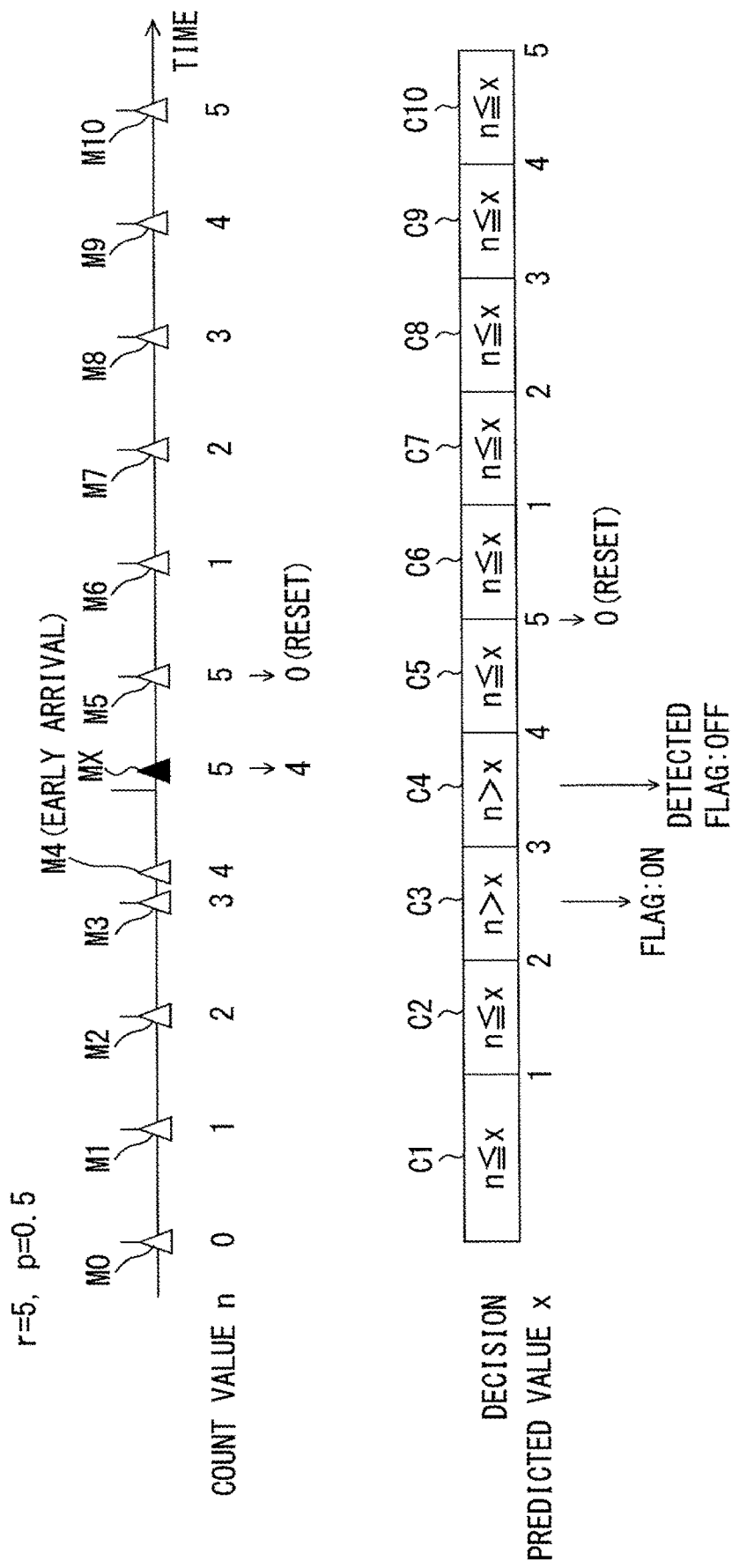

In the example depicted in FIG. 9, the attack detection device 1 receives an attack message in addition to the messages M1-M10 indicated in FIG. 8. Similar to the example illustrated in FIG. 8, when the message M4 arrives at the attack detection device 1, the count value n is incremented from 3 to 4, and the warning flag is changed from OFF state to ON state. Subsequently to the message M4, an attack message MX arrives at the attack detection device 1.

When the attack message MX arrives at the attack detection device 1 within a counting period C4, the count value n is incremented from 4 to 5. At this moment, the predicted value x calculated by the prediction unit 3 is 4. Thus, the count value n is larger than the predicted value x. Accordingly, the decision unit 5 checks the warning flag. At this moment, the warning flag is in ON state. In this case, the decision unit 5 decides that the network 100 has been attacked.

As described above, when the count value n exceeds the predicted value x due to a message received while the warning flag is in ON state, the decision unit 5 decides that the network 100 has been attacked. Accordingly, when an attack message arrives after an early arriving message arrived, the attack detection device 1 can detect this attack message.

Figure 10:
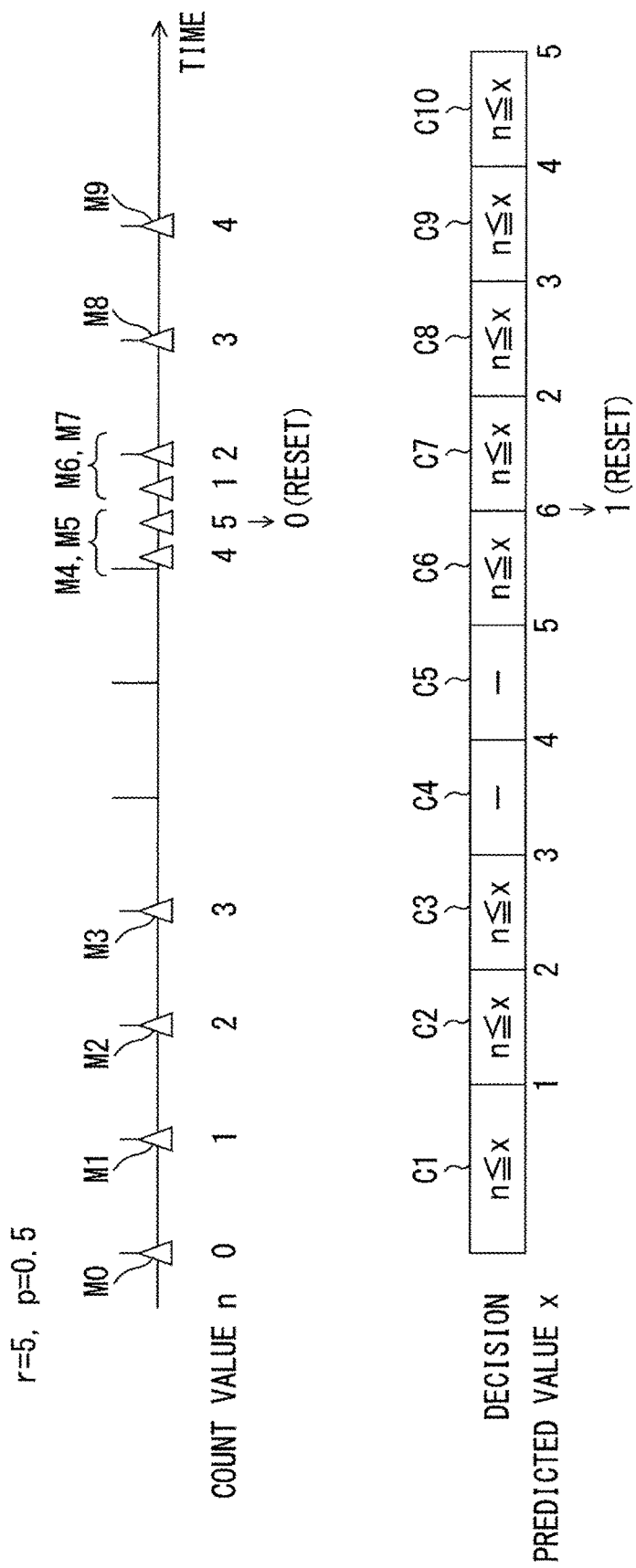

In the example depicted in FIG. 10, messages M4-M6 are delayed. An attack message is not present.

Subsequently to the messages M1-M3, when the messages M4-M5 arrive at the attack detection device 1 within a counting period C6, the count value n is incremented from 3 to 5. At this moment, the predicted value x is 6. Thus, the count value n has not exceeded the predicted value x. In this case, the decision unit 5 decides that the network 100 has not been attacked. Here, since the count value n has reached the threshold r, the decision unit 5 resets the count value n and the predicted value x. At this moment, the count value n is updated from 5 to zero, and the predicted value x is updated to "x−n". In particular, the predicted value x is updated from 6 to 1.

When messages M6-M7 arrive at the attack detection device 1 within a counting period C7, the count value n is incremented from zero to 2. Meanwhile, the predicted value x is incremented from 1 to 2. Thus, the count value n has not exceeded the predicted value x. In this case, the decision unit 5 decides that the network 100 has not been attacked. In this way, when a normal message is delayed, the attack detection device 1 does not decide that this message is an attack message.

Figure 11:
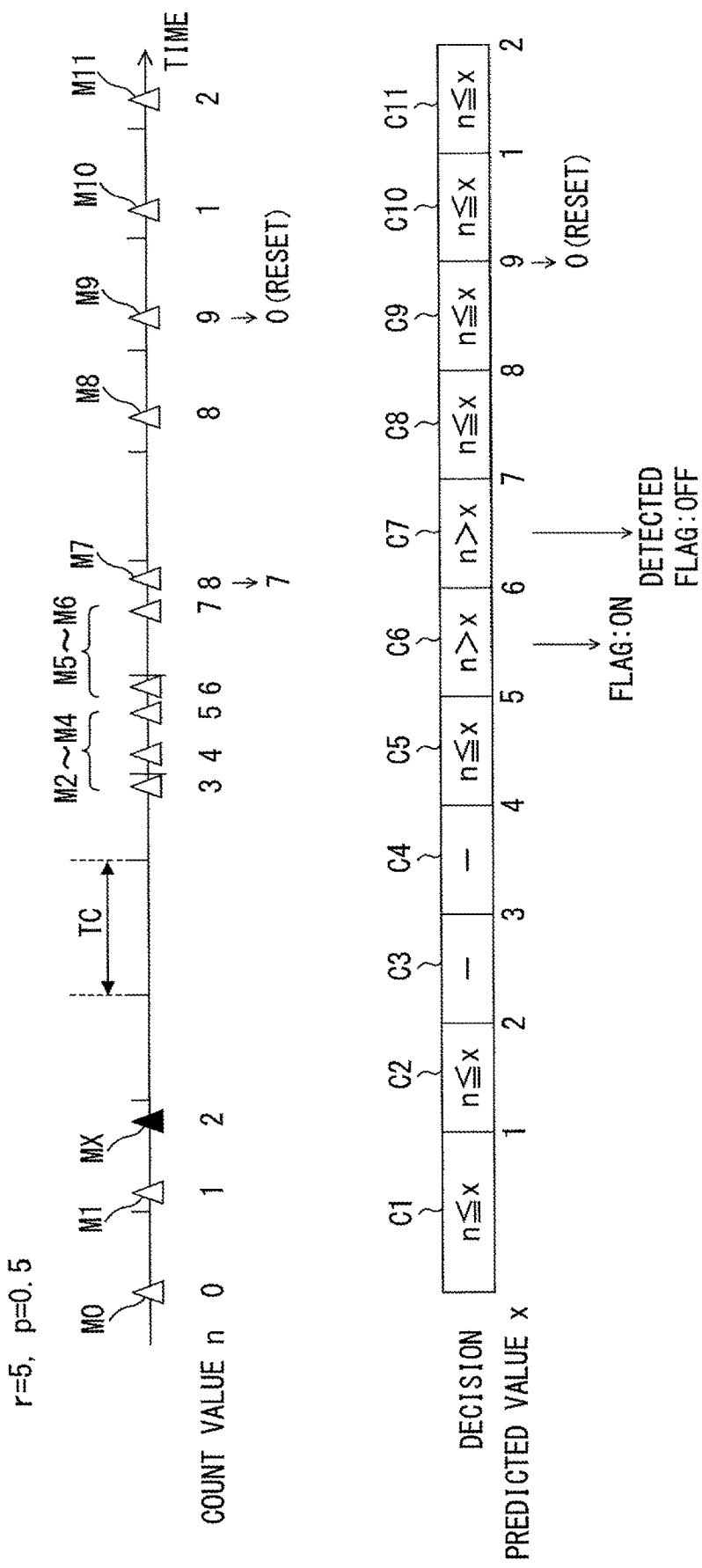

In the example depicted in FIG. 11, an attack message is transmitted at a time between the transmissions of messages M1 and M2. Messages M2-M7 are transmitted at time intervals shorter than a specified transmission cycle TC. In this example, the count value n and the predicted value x are reset when the following three conditions are satisfied:
(1) The count value n is equal to or larger than the threshold r.
(2) The warning flag is in OFF state.
(3) The difference between the reception times of two messages that arrived at the attack detection device 1 most recently falls within a specified error range with respect to the transmission cycle TC (For example, when the transmission cycle TC is 10 milliseconds and the specified error is 10 percent, the difference between the reception times of the two messages needs to be within 9-11 milliseconds).

When an attack message MX arrives at the attack detection device 1 within a counting period C2, the count value n is incremented from 1 to 2. At this moment, the predicted value x is 2, and the count value n has not exceeded the predicted value x. In this case, the decision unit 5 does not decide that the network 100 has been attacked. The warning flag is maintained in OFF state.

When messages M2-M4 arrive at the attack detection device 1 within a counting period C5, the count value n is incremented from 2 to 5. At this moment, the predicted value x is 5. Accordingly, since the count value n has not exceeded the predicted value x, the decision unit 5 decides that the network 100 has not been attacked. When the message M4 arrives at the attack detection device 1, the count value n is 5 and thus has reached the threshold r. However, the difference between the reception times of the messages M4 and M5 is small, and the condition (3) described above is not satisfied. Hence, neither the count value n nor the predicted value x is reset.

When messages M5-M6 arrive at the attack detection device 1 within a counting period C6, the count value n is incremented from 5 to 7. At this moment, the predicted value x is 6, and the count value n is larger than the predicted value x. However, since the warning flag is in OFF state, the decision unit 5 does not decide that the network 100 has been attacked. However, the warning flag is changed from OFF state to ON state. Also in this case, the difference between the reception times of the messages M5 and M6 is small, and the condition (3) described above is not satisfied. Hence, neither the count value n nor the predicted value x is reset.

When a message M7 arrives at the attack detection device 1 within a counting period C7, the count value n is incremented from 7 to 8. At this moment, the predicted value x is 7, and the count value n is larger than the predicted value x. In addition, the warning flag is in ON state. Thus, the decision unit 5 decides that the network 100 has been attacked and decrements the count value n by 1. The warning flag is changed from ON state to OFF state. Also in this case, the difference between the reception times of the messages M6 and M7 is small, and the condition (3) described above is not satisfied. Hence, neither the count value n nor the predicted value x is reset.

When a message M8 arrives at the attack detection device 1 within a counting period C8, the count value n is incremented from 7 to 8. At this moment, the predicted value x is 8, and the count value n has not exceeded the predicted value x. Accordingly, the decision unit 5 decides that the network 100 has not been attacked. In this case, the difference between the reception times of the messages M7 and M8 is large, and the condition (3) described above is not satisfied. Hence, neither the count value n nor the predicted value x is reset.

When a message M9 arrives at the attack detection device 1 within a counting period C9, the count value n is incremented from 8 to 9. At this moment, the predicted value x is 9, and the count value n has not exceeded the predicted value x. Accordingly, the decision unit 5 decides that the network 100 has not been attacked. In this case, the difference between the reception times of the messages M8 and M9 is almost equal to the transmission cycle TC, and thus the condition (3) described above is satisfied. In addition, the conditions (1) and (2) described above are satisfied. Hence, each of the count value n and the predicted value x is updated to zero.

Figure 12:
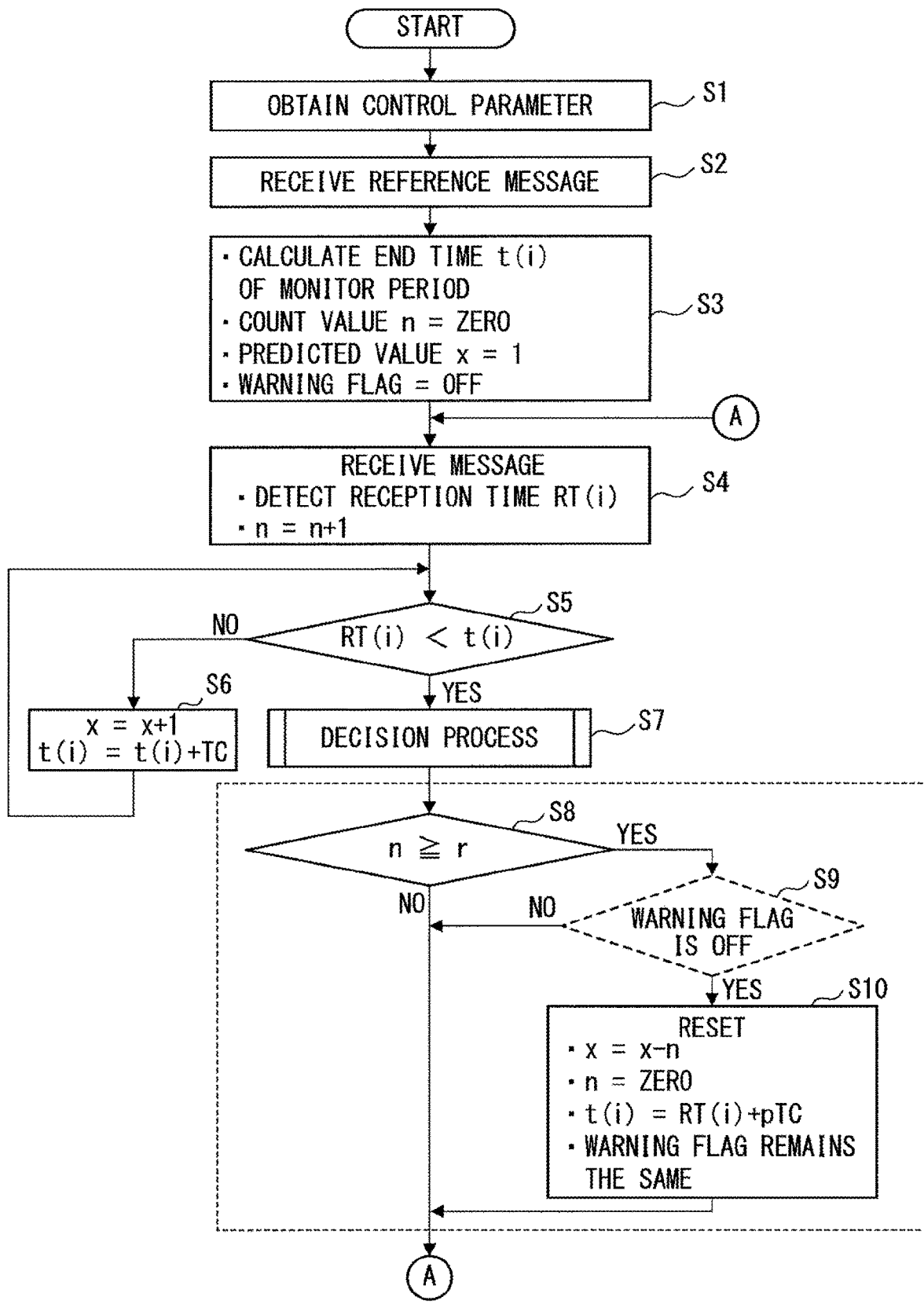
FIG. 12 is a flowchart indicating an example of an attack detection method of a first embodiment.

FIG. 12 is a flowchart indicating an example of an attack detection method of the first embodiment. For example, the process of this flowchart is performed by the attack detection device 1 when a detection target ID is specified.

In S1, the attack detection device 1 obtains a control parameter. The control parameter includes a transmission cycle TC for a detection target ID, a threshold r representing a cycle in which resetting is performed, and a timing parameter p. For example, the control parameter may be stored in advance in the memory 15 depicted in FIG. 5. Alternatively, the control parameter may be provided by a user or a network administrator.

In S2, the receiver 2 receives a reference message. The reference message may be, for example, an initial message that arrives at the attack detection device 1 after the process of the flowchart depicted in FIG. 12 is started. In this case, the receiver 2 records a reception time RT(0) of the reference message.

In S3, the attack detection device 1 performs an initialization process. In particular, the counter 4 initializes a count value n, i.e., sets the count value n to zero. The prediction unit 3 calculates an end time t(i) of an initial monitor period. In this example, the end time t(i) of the initial monitor period is calculated by adding (1+p)*TC to the reception time RT(0) of the reference message. TC represents a transmission cycle for the detection target ID, and p represents a timing parameter determined in advance (e.g., 0.5). The prediction unit 3 sets 1 as a predicted value x. The decision unit 5 sets a warning flag in OFF state.

In S4, the receiver 2 receives a message. At this moment, the receiver 2 detects a reception time RT(i) of this message. The counter 4 increments the count value n by 1.

In S5-S6, the attack detection device 1 decides whether the reception time RT(i) of the message precedes the end time t(i) of the monitor period. When the reception time RT(i) of the message does not precede the end time t(i) of the monitor period, the attack detection device 1 increments the predicted value x by 1 and adds the transmission cycle TC to the end time t(i). The processes of S5-S6 are repeatedly performed until the end time t(i) of the monitor period becomes later than the reception time RT(i) of the message. When the end time t(i) of the monitor period becomes later than the reception time RT(i) of the message, the process of the attack detection device 1 shifts to S7.

In S7, the attack detection device 1 performs a decision process of deciding whether the network 100 has been attacked (i.e., whether an attack message has been input to the network 100). The decision process is performed mainly by the decision unit 5.

Figure 13:
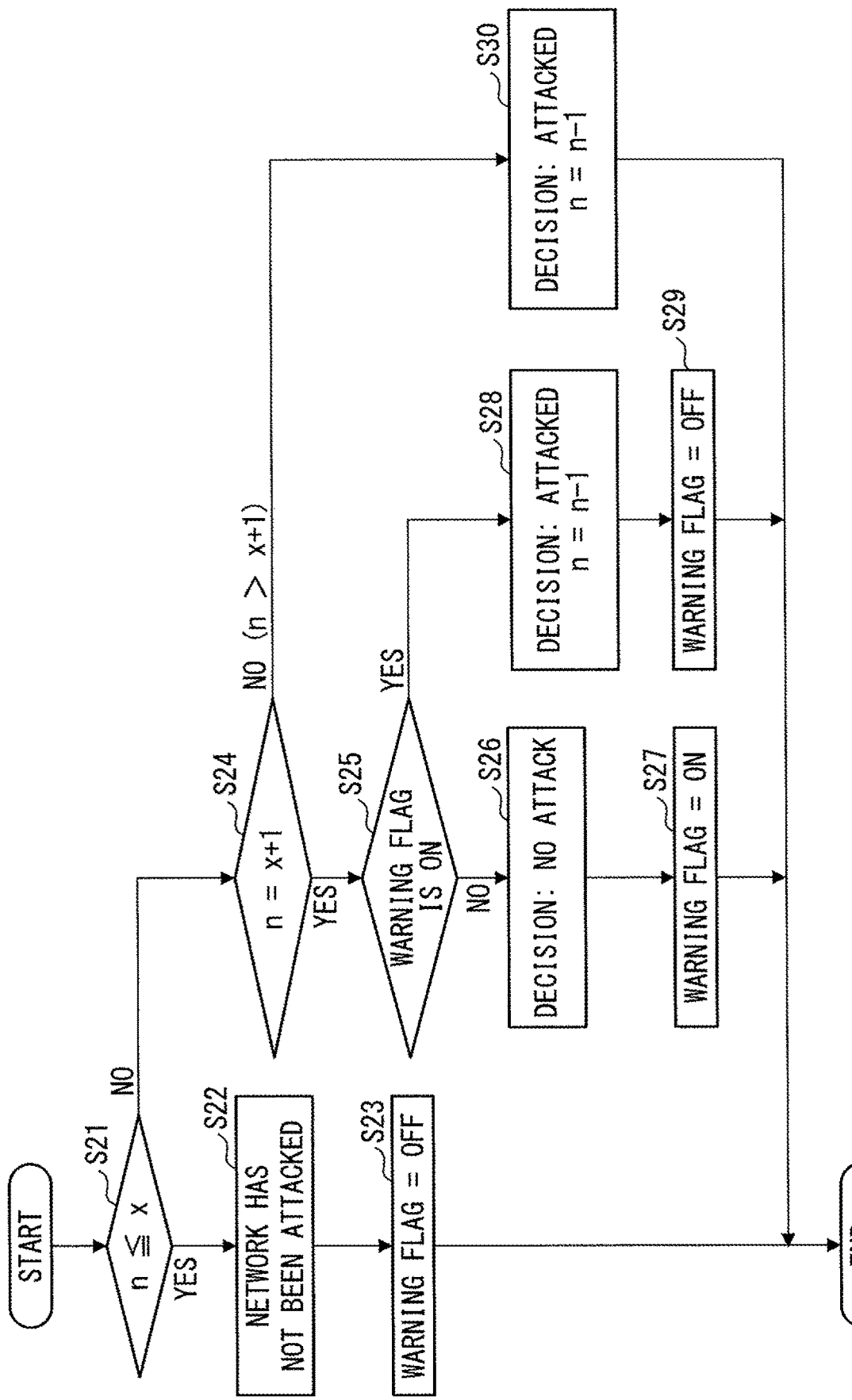
FIG. 13 is a flowchart indicating an example of a decision process of a first embodiment.

FIG. 13 is a flowchart indicating an example of a decision process of the first embodiment. This decision process corresponds to S7 depicted in FIG. 12 and is performed every time a message (a normal message or an attack message) arrives at the attack detection device 1.

In S21, the decision unit 5 compares a count value n with a predicted value x. When the count value n is equal to or smaller than the predicted value x, the decision unit 5 decides in S22 that the network 100 has not been attacked. In S23, the decision unit 5 sets a warning flag in OFF state. When the count value n is larger than the predicted value x, the decision unit 5 decides in S24 whether the count value n is x+1 (i.e., a reference value obtained by adding 1 to the predicted value x).

When the count value n is x+1, the decision unit 5 checks a state of the warning flag in S25. When the warning flag is in OFF state, the decision unit 5 decides in S26 that the network 100 has not been attacked. However, the decision unit 5 changes the warning flag from OFF state to ON state in S27.

When the warning flag is in ON state (S25: Yes), the decision unit 5 decides in S28 that the network 100 has been attacked. The decision unit 5 also decrements the count value n by 1. In S29, the decision unit 5 changes the warning flag from ON state to OFF state.

When the count value n is larger than x+1 (S24: No), the decision unit 5 decides in S30 that the network 100 has been attacked. The decision unit 5 also decrements the count value n by 1.

As described above, when the count value n is equal to or smaller than the expected value x, the decision unit 5 decides that the network 100 has not been attacked. When the count value n becomes larger than the predicted value x due to a message received while the warning flag is in OFF state, the decision unit 5 also does not decide that the network 100 has been attacked. In this case, however, the warning flag is changed from OFF state to ON state. Meanwhile, when the count value n becomes larger than the predicted value x due to a message received while the warning flag is in ON state, the decision unit 5 decides that the network 100 has been attacked. When the count value n is larger than x+1, the decision unit may decide that the network 100 has been attacked, irrespective of the state of the warning flag.

When the decision unit 5 decides that the network 100 has been attacked, the decision unit 5 decrements the count value n by 1. In the example depicted in FIG. 9, when an attack is detected within the counting period C4, the count value n is updated from 5 to 4. In this way, the count value n is decremented when an attack message is detected. Thus, the count value n is obtained by counting the number of normal messages.

When it is decided that the network 100 has been attacked, the attack detection device 1 outputs an alarm signal. The alarm signal reports to the user that the network 100 has been attacked. In this situation, the attack detection device 1 may disconnect the network 100 from an external network. When the network 100 is implemented in a vehicle, the attack detection device 1 may output a control signal to stop the vehicle.

As described above, when a normal message early arrives at the attack detection device 1, the warning flag is changed from OFF state to ON state. Thus, the attack detection device 1 decides that the network 100 could possibly have been attacked. At this moment, however, the attack detection device 1 does not decide whether a normal message has early arrived or whether an attack message has been input. The attack detection device 1 performs monitoring as to whether a next message arrives at a time near a scheduled arrival time. In the example depicted in FIG. 8, the attack detection device 1 receives the next message (i.e., message M5) at a time near the scheduled arrival time. In this case, the attack detection device 1 decides that the message M4 is a normal message that arrived early, not an attack message. Accordingly, the first embodiment allows erroneous detection that could be caused by an early arriving normal message to be avoided or suppressed.

When the decision process is finished, the attack detection device 1 decides whether to perform a reset process. In particular, in S8, the reset controller 6 compares the count value n with a threshold r. The threshold r represents a cycle in which resetting is performed. When the count value n is smaller than the threshold r, the process of the attack detection device 1 returns to S4. When the count value n is equal to or larger than the threshold r, the reset controller 6 checks the state of the warning flag in S9.

When the warning flag is in OFF state, the reset controller 6 performs the reset process in S10. In the reset process, the predicted value x is updated from "x" to "x−n". The count value n is initialized and thus becomes zero. In addition, "RT(i)+p*TC" is set as an end time(i) for a next monitor period. RT(i) represents an reception time of a message received by the receiver 2 just before the present time. TC represents a transmission cycle for a detection target ID. p represents a timing parameter. Subsequently, the process of the attack detection device 1 returns to S4.

The reset controller 6 may skip the process of S9. In this case, when the count value n reaches the threshold r, the reset process is performed irrespective of the state of the warning flag.

Figure 14:
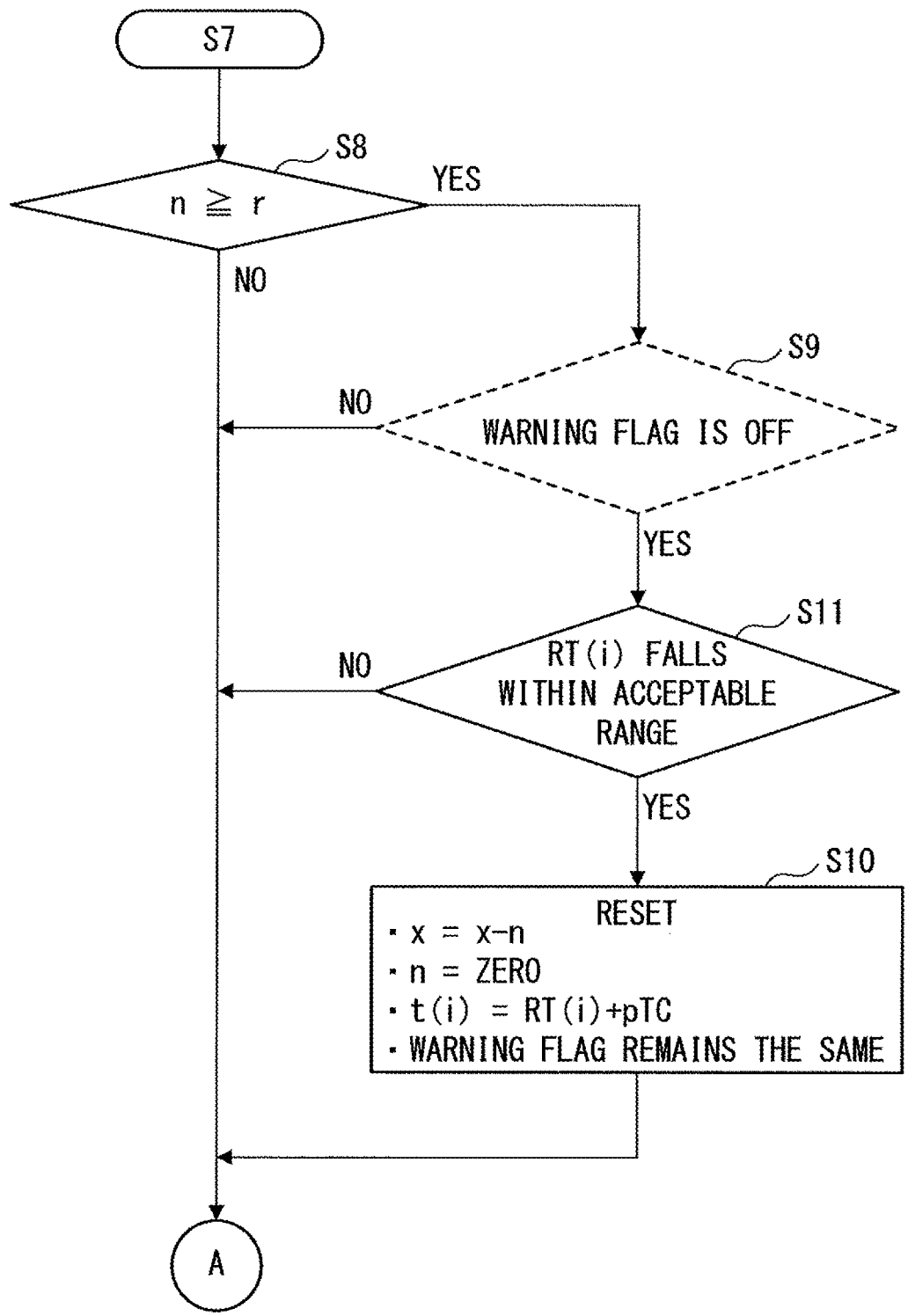
FIG. 14 is a flowchart indicating another example of a reset process.

FIG. 14 is a flowchart indicating another example of the reset process. The procedure depicted in FIG. 14 is performed instead of S8-S10 indicated in FIG. 12. In the procedure depicted in FIG. 14, accordingly, S11 is performed in addition to S8-S10 indicated in FIG. 12. When the reset controller 6 performs the procedure depicted in FIG. 14, the attack detection device 1 obtains, in S1 depicted in FIG. 12, information indicating an acceptable range for a targeted reception time.

In S11, the reset controller 6 decides whether the reception time RT(i) of the message received in S4 falls within the acceptable range for the targeted reception time. The targeted reception time indicates an ideal reception time for a message. The ideal reception time is a center of each counting period, where the timing parameter p described above is 0.5. In the example indicated in FIG. 6, a start time t(4) and end time t(5) of the counting period C5 are calculated by, for example, the formulae below. In this example, the reference time TS is 3 milliseconds, the transmission cycle TC is 10 milliseconds, and the timing parameter p is 0.5.

$$t(4)=3+4.5*10=48$$

$$t(5)=3+5.5*10=58$$

In this case, the targeted reception time for the counting period C5 is the average of t(4) and t(5), i.e., 53 milliseconds. Alternatively, the targeted reception time for the counting period C5 may be calculated by subtracting "p*TC" from the end time of the counting period C5.

For example, the acceptable range is, but is not limited to, ±20 percent of the transmission cycle TC. When the reception time RT(i) of the message received in S4 falls within the acceptable range for the targeted reception time, the reset controller 6 performs the reset process of S10. When the reception time RT(i) does not fall within the acceptable range, the reset process of S10 is skipped.

In the procedure depicted in FIG. 14, as described above, the resetting is performed when the count value n is equal to or larger than the threshold r with the warning flag being in OFF state and with the reception time of a massage being close to a targeted reception time. When the reception time of a message is close to the targeted reception time, it is considered that this message is likely to be a normal message. Accordingly, the procedure depicted in FIG. 14 allows resetting that could need to be performed due to an attack message to be avoided or suppressed. As a result, the accuracy in the detection performed by the attack detection device 1 is enhanced.

Figure 15:
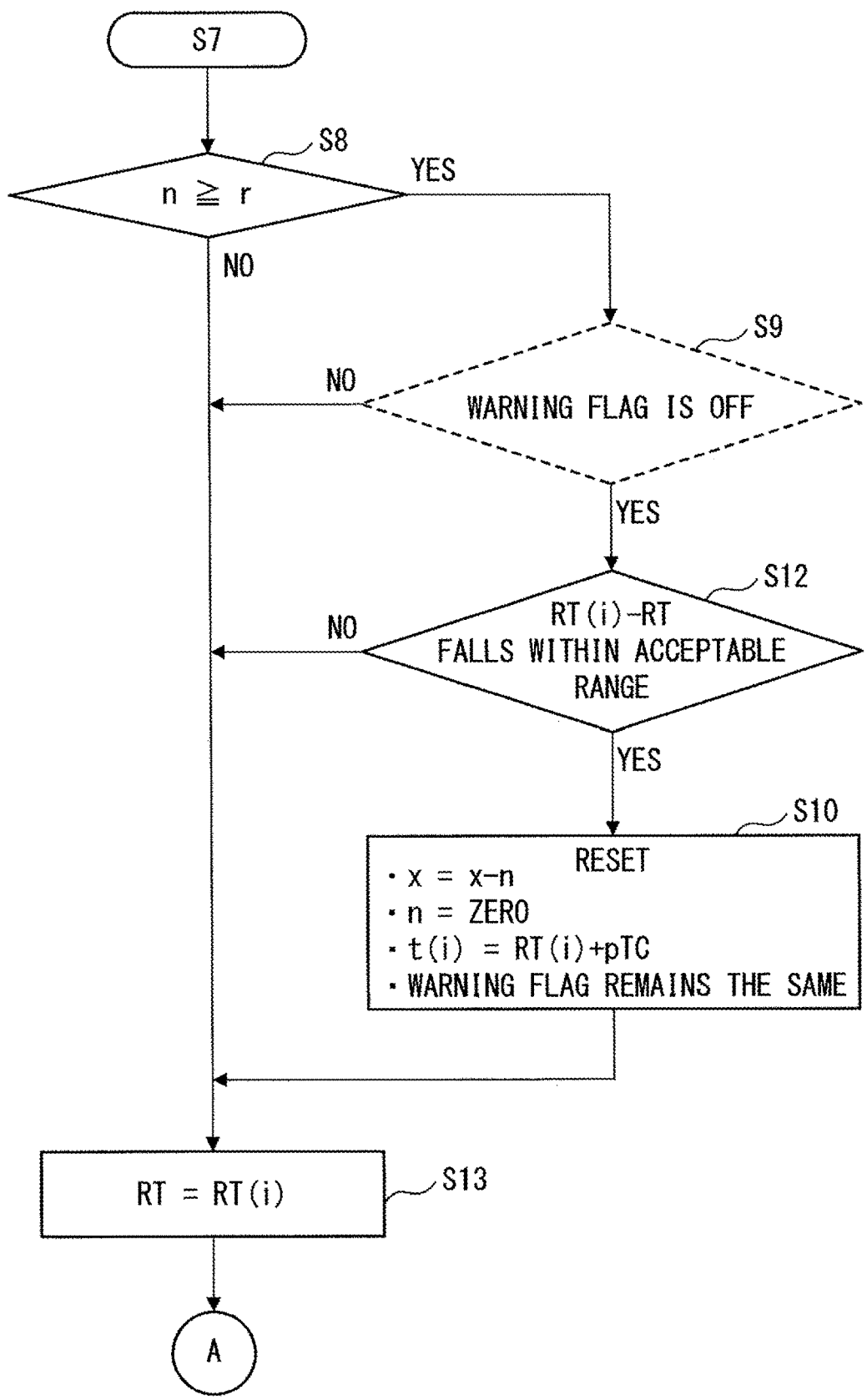
FIG. 15 is a flowchart indicating still another example of a reset process.

FIG. 15 is a flowchart indicating still another example of the reset process. As with the procedure illustrated in FIG. 14, the procedure depicted in FIG. 15 is performed instead of S8-S10 indicated in FIG. 12. In the procedure depicted in FIG. 15, however, S12 and S13 are performed in addition to S8-S10 indicated in FIG. 12. When the reset controller 6 performs the procedure depicted in FIG. 15, the attack detection device 1 obtains, in S1 depicted in FIG. 12, information indicating an acceptable range for a difference in reception time.

In S12, the reset controller 6 decides whether a difference in reception time between two messages received by the receiver 2 just before the present time falls within a specified acceptable range. This difference is calculated by subtracting a reference time TR representing a reception time of a message that arrived just before the present time from a reception time RT(i) of a message that has newly arrived. Assume that the reception time of the message that arrived just before the present time is recoded in a memory as a reference time RT. The acceptable range for the difference in reception time is, for example, ±20 percent of the transmission cycle TC for a detection target ID. In this case, the acceptable range is between 0.8*TC to 1.2*TC.

When the difference in reception time between two messages received just before the present time falls within the acceptable range, the reset controller 6 performs the reset process of S10. When the difference does not fall within the acceptable range, the reset process of S10 is skipped.

In S13, the reset controller 6 records a reception time RT(i) of the message received in S4 as a reference time RT for a next message. In this case, the reference time RT that has been recorded is updated to the reception time of the newly received message. The process of S13 is performed irrespective of whether an attack message has been detected.

As described above, in the procedure depicted in FIG. 15, it is decided whether the difference in reception time between two messages received by the receiver 2 just before the present time is almost equal to the transmission cycle TC. When the difference from the transmission cycle TC is large, it is decided that an attack message has been received, and the reset process is not performed. As a result, operations of an attack detection algorithm are prevented from being unstable.

S6 may be performed when it is decided in S5 that the reception time RT(i) of the message is the same as or precedes the end time t(i) of the monitor period. The attack detection device 1 may perform attack detection for each of a plurality of detection target IDs. In this case, the attack detection device 1 may perform the process of the flowchart depicted in FIG. 12 for the detection target IDs in parallel.

Second Embodiment

Figure 16:
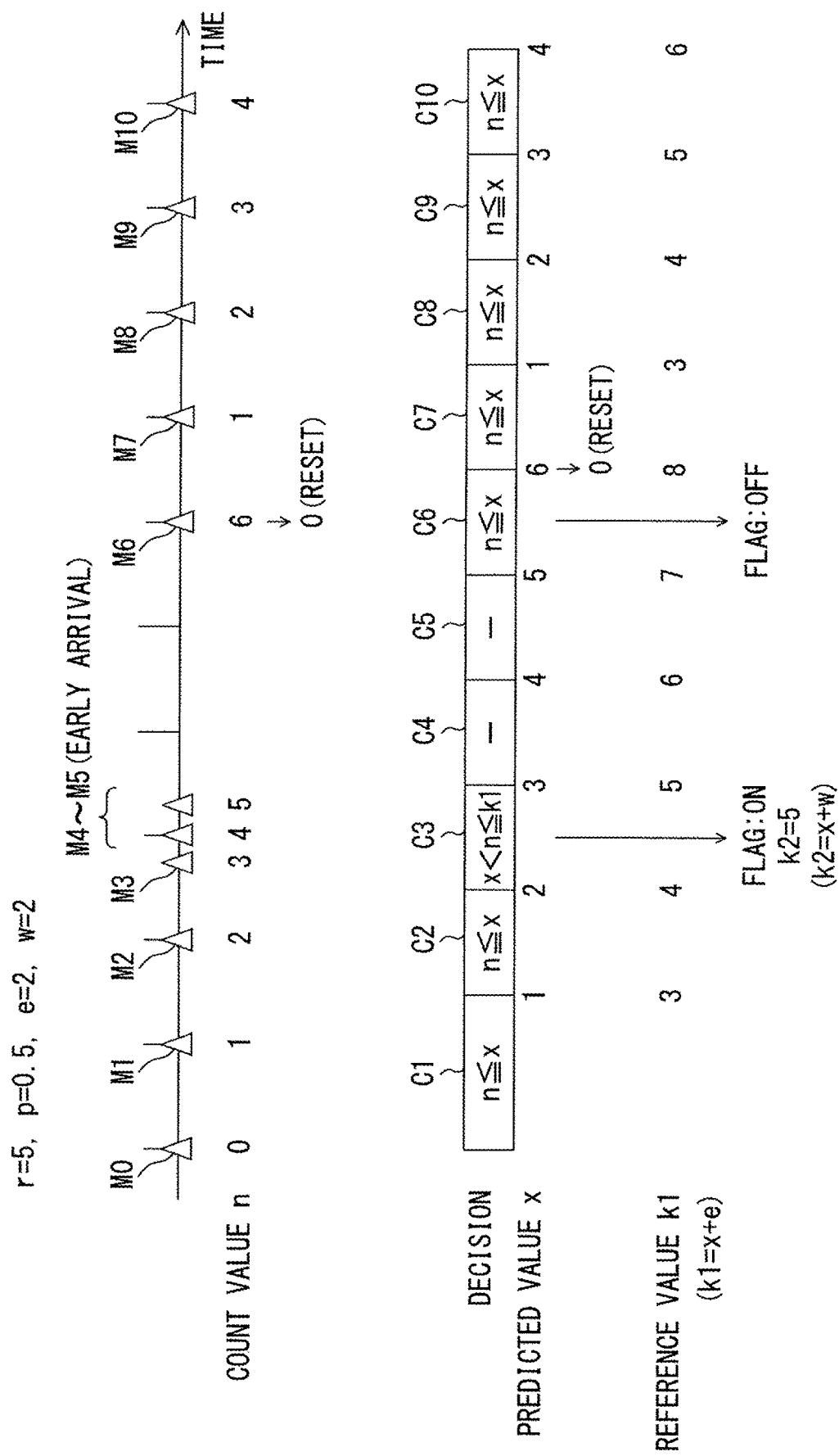
FIGS. 16-18 illustrate examples of operations of an attack detection method of a second embodiment.
Figure 17:
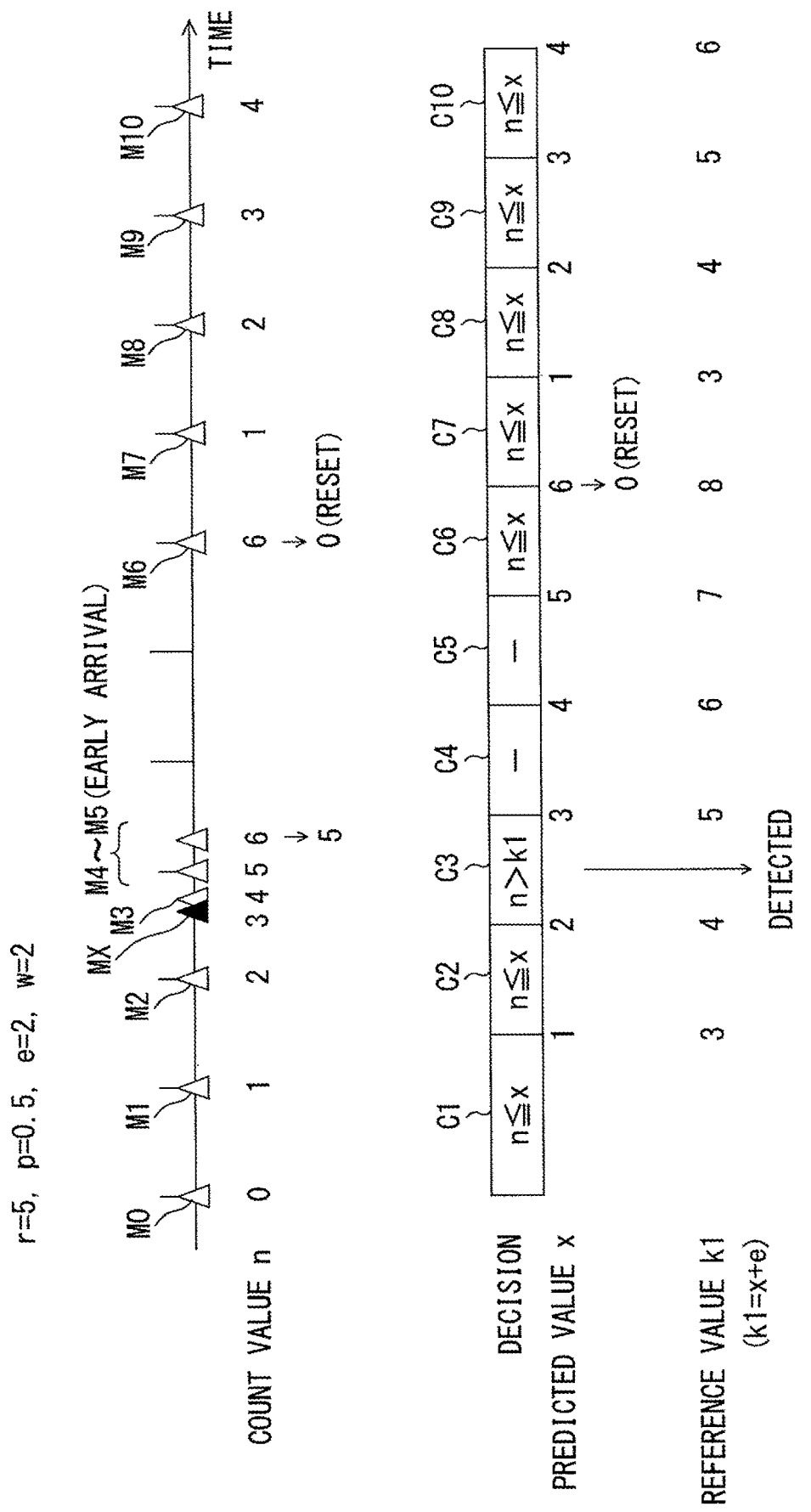
Figure 18:
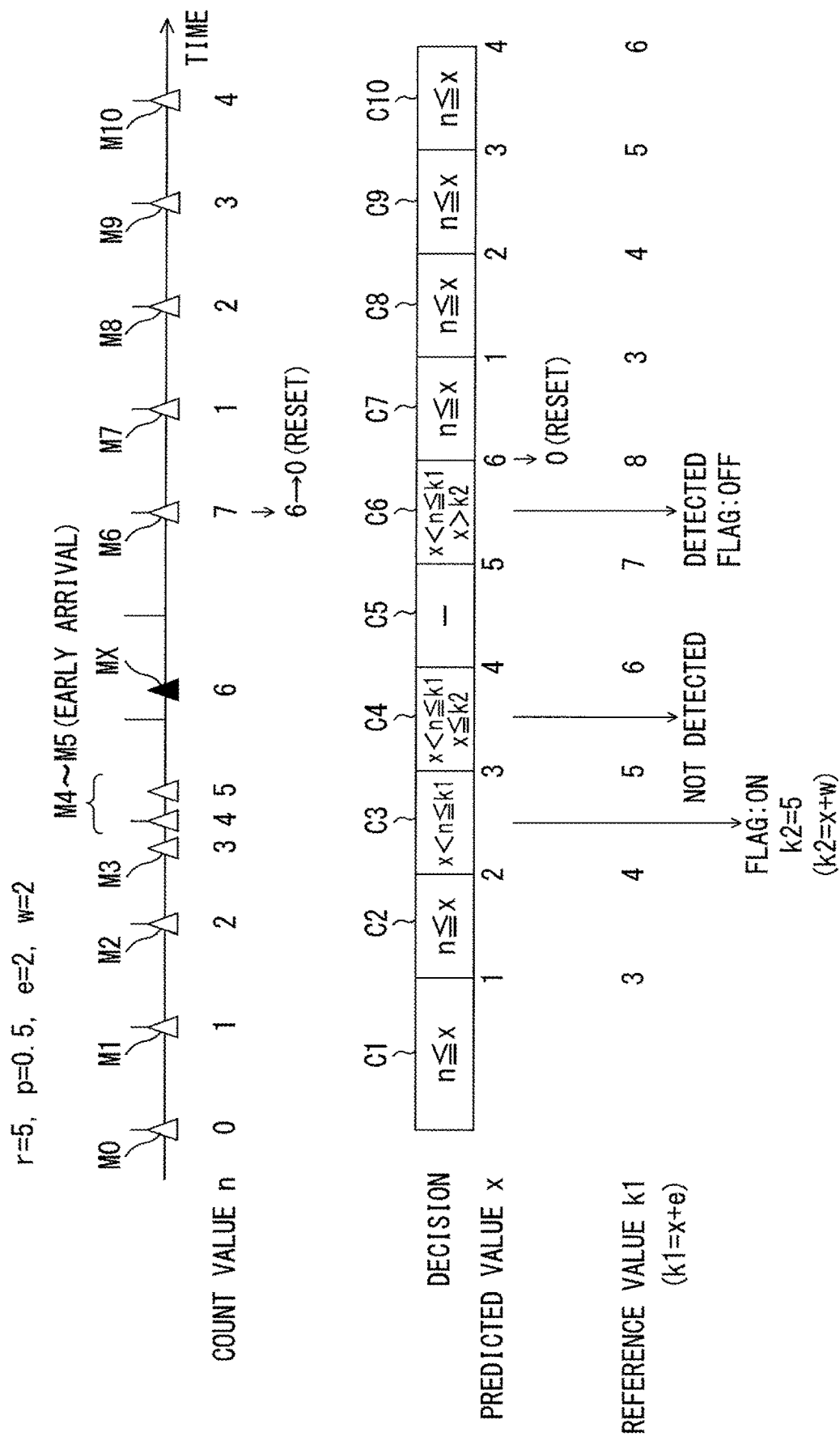

FIGS. 16-18 illustrate examples of operations of an attack detection method according to a second embodiment. The white triangle symbol "△" represents a timing at which a normal message arrives at the attack detection device 1. The black triangle symbol "▲" represents a timing at which an attack message arrives at the attack detection device 1. As in the first embodiment, upon receipt of a reference message M0, the attack detection device 1 starts a process of counting received messages.

As in the first embodiment, a count value n represents the number of messages that have arrived at the attack detection device 1 and is counted by the counter 4. When the count value n is equal to or larger than a threshold r with a warning flag being in OFF state, the count value n is reset and thus becomes zero. In this example, the threshold r is 5.

As in the first embodiment, a predicted value x represents the number of messages anticipated to arrive at the attack detection device 1 during each monitor period and is calculated by the prediction unit 3. When the count value n is reset, the predicted value x is updated to "x−n".

In the example depicted in FIG. 16, an attack message is not present. However, messages M4 and M5 arrive at the attack detection device 1 prior to scheduled arrival times. In particular, although the messages M4 and M5 were respectively estimated to arrive at counting periods C4 and C5, the messages M4 and M5 actually arrive at a counting period C3. Note that the warning flag is initialized and thus set to OFF state when the attack detection process starts.

As in the first embodiment, when a message M1 arrives at the attack detection device 1, the count value n is incremented from 0 to 1. The message M1 arrives at the attack detection device 1 within a counting period C1, and hence the predicted value x calculated by the prediction unit 3 is 1. At this moment, the count value n has not exceeded the predicted value x. In this case, the decision unit 5 decides that the network 100 has not been attacked.

Similarly, when a message M2 arrives at the attack detection device 1, the decision unit 5 decides that the network 100 has not been attacked. In response to the arrival of the message 2, the count value n is incremented from 1 to 2.

When messages M3-M5 arrive at the attack detection device 1 within a counting period C3, the count value n is incremented from 2 to 5. Meanwhile, the predicted value x is 3 for the counting period C3. Thus, the count value n exceeds the predicted value x. Accordingly, the decision unit 5 compares the count value with a reference value k1. The reference value k1 is obtained by adding an early-arrival acceptable value e to the predicted value x. In this example, the early-arrival acceptable value e is 2. Hence, the reference value k1 is 5 at this moment. Thus, the count value n satisfies a condition "x<n≤k1", and hence the decision unit 5 changes the warning flag from OFF state to ON state. However, the decision unit 5 does not decide that the network 100 has been attacked.

In addition, the decision unit 5 records the current predicted value x as a start value s. The decision unit 5 obtains a reference value k2 by adding an early-arrival grace period w to the start value s. The early-arrival grace period w is an integer expressed in units of transmission cycles TC of messages and is 2 in this example. The reference value k2 is recorded in a memory that the decision unit 5 can access. The early-arrival grace period w is preferably equal to or greater than the early-arrival acceptable value e, and in particular, the early-arrival grace period w is preferably equal to the early-arrival acceptable value e.

The start time s corresponds to a timing at which the count value n satisfies the condition "x<n≤k1" owing to a message arrival. Accordingly, when the early-arrival grace period w is equal to or greater than the early-arrival acceptable value e, the reference value k2 obtained by adding the early-arrival grace period w to the start value s corresponds to a timing at which the count value n is estimated to become equal to the predicted value x again in the absence of an attack message.

When a message M6 arrives at the attack detection device 1 within a counting period C6, the count value n is incremented from 5 to 6. Meanwhile, the predicted value x is 6 for the counting period C6. Thus, the count value n does not exceed the predicted value x. Accordingly, the decision unit 5 decides that the network 100 has not been attacked. The decision unit 5 also changes the warning frag from ON state to OFF state.

In addition, since the count value n is equal to or larger than the threshold r with the warning flag being in OFF state, the decision unit 5 performs the reset process. In the second embodiment, the count value n, the predicted value x, and the start value s are reset. The count value n is updated to zero, the predicted value x is updated to "x−n", and the start value s is updated to "s−n".

As described above, when the count value n exceeds the predicted value x, the warning flag is changed from OFF state to ON state. However, as in the first embodiment, at this moment, the attack detection device 1 does not decide whether a normal message has early arrived or whether an attack message has been input. When a subsequent message is received, the attack detection device 1 decides whether a normal message has early arrived or whether an attack message has been input. In the example depicted in FIG. 16, the attack detection device 1 receives the subsequent message (i.e., message M6) within the counting period C6. In this case, during the period from the time of arrival of the message M5 to the time of the arrival of the message M6, the predicted value x is incremented from 3 to 6. As a result, the count value n becomes equal to or smaller than the predicted value x, and the decision unit 5 decides that the network 100 has not been attacked. Accordingly, the second embodiment also allows erroneous detection that could be caused by an early arriving normal message to be avoided or suppressed.

In the second embodiment, in addition, an attack message is monitored according to a comparison between the count value n and the reference value k1. The reference value k1 is obtained by adding the early-arrival acceptable value e to the predicted value x. Hence, when the number of early arriving messages is less than e, it is not decided that these early arriving messages are attack messages.

In the example depicted in FIG. 17, the attack detection device 1 receives an attack message MX in addition to the messages M1-M10 depicted in FIG. 16. The attack message MX arrives at the attack detection device 1 within the counting period C3. Accordingly, the early arriving messages M4-M5 and the attack message MX in addition to the message M3 arrive at the attack detection device 1 within the same counting period.

When the attack message MX and the normal messages M3-M5 arrive at the attack detection device 1 within the counting period C3, the count value n is incremented from 2 to 6. Meanwhile, the predicted value x is 3 for the counting period C3. Thus, the count value n is larger than the predicted value x. Accordingly, the decision unit 5 compares the count value with the reference value k1. In this example, the early-arrival acceptable value e is 2, and hence the reference value k1 is 5. Thus, at this moment, the count value n is larger than the reference value k1. In this case, the decision unit 5 decides that the network 100 has been attacked. Accordingly, when excessively many messages, or more messages than the early-arrival acceptable value e (in the example described above, the attack message MX and the early arriving messages M4-M5), arrive intensively in a short period, the count value n exceeds the reference value k1, and it is decided that the network 100 has been attacked.

Also in the example depicted in FIG. 18, the attack detection device 1 receives an attack message MX in addition to the messages M1-M10 indicated in FIG. 16. However, the attack message MX arrives at the attack detection device 1 within the counting period C4. In particular, the attack message MX arrives within a counting period that follows a counting period within which the early arriving messages arrived.

In this case, when the normal messages M3-M5 arrive at the attack detection device 1 within the counting period C3, the count value n is incremented from 2 to 5. At this moment, the predicted value x is 3 for the counting period C3, and hence the count value n is larger than the predicted value x. Accordingly, the decision unit 5 compares the count value n with the reference value k1. The early-arrival acceptable value e is 2, and hence the reference value k1 is 5. Thus, the count value n satisfies a condition "x<n≤k1", and hence the decision unit 5 changes the warning flag from OFF state to ON state. However, the decision unit 5 does not decide that the network 100 has been attacked.

In addition, the decision unit 5 records the current predicted value x as a start value s. The decision unit 5 obtains a reference value k2 by adding an early-arrival grace period w to the start value s. In this example, the early-arrival grace period w is 2. Hence, the reference value k2 is 5. The reference value k2 is recorded in a memory that the decision unit 5 can access.

When the attack message MX arrives at the attack detection device 1 within the counting period C4, the count value n is incremented from 5 to 6. The predicted value x is 4 for the counting period C4, and hence the count value n is larger than the predicted value x. Accordingly, the decision unit 5 compares the count value with the reference value k1. The reference value k1, which is obtained by adding 2 to the predicted value x, is 6. Thus, the count value n satisfies the condition "x<n≤k1".

At this moment, the warning flag is in ON state. Accordingly, the decision unit 5 compares the predicted value x with the reference value k2. The reference k2 is 5 as calculated for the counting period C3. The predicted value x (=4) is equal to or less than the reference value k2. In this case, the decision unit 5 does not decide that the network 100 has been attacked. However, the decision unit 5 maintains the warning flag in ON state.

As described above, the reference value k2 corresponds to a timing at which the count value n is estimated to become equal to the predicted value x again. Hence, when the predicted value x is equal to or smaller than the reference value k2, the decision unit 5 decides that the count value n has not become equal to the predicted value x again yet. Accordingly, the decision unit 5 does not decide whether the network 100 has been attacked.

When the message M6 arrives at the attack detection device 1 within the counting period C6, the count value n is incremented from 6 to 7. The predicted value x is 6 for the counting period C6, and hence the count value n is larger than the predicted value x. Accordingly, the decision unit 5 compares the count value n with the reference value k1. The reference value k1, which is obtained by adding 2 to the predicted value x, is 8. Thus, the count value n satisfies the condition "x<n≤k1".

At this moment, the warning flag is in ON state. Accordingly, the decision unit 5 compares the predicted value x with the reference value k2. The reference k2 is 5 as calculated for the counting period C3. The predicted value x (=6) is larger than the reference value k2. In this case, the decision unit 5 decides that the network 100 has been attacked. The decision unit 5 also changes the warning flag from ON state to OFF state.

As described above, the reference value k2 corresponds to a timing at which the count value n is estimated to become equal to the predicted value x again. Hence, when the predicted value x exceeds the reference value k2, it is considered that the count value n has become equal to the predicted value x again if there is no attack message. Accordingly, the decision unit 5 decides whether the network 100 has been attacked.

In addition, since the count value n is equal to or larger than the threshold r with the warning flag being in OFF state, the decision unit 5 performs the reset process. In the second embodiment, the count value n, the predicted value x, and the start value s are reset. The count value n is updated to zero, the predicted value x is updated to "x−n", and the start value s is updated to "s−n".

As described above, when the attack message MX arrives while the warning flag is in ON state, the count value n exceeds the predicted value x (or satisfies the condition "x<n≤k1"), and the predicted value x exceeds the reference value k2. Hence, an attack on the network 100 is detected. However, an attack on the network 100 is not necessarily detected when an attack message MX arrives and may be detected when a subsequent message arrives. In the example depicted in FIG. 18, an attack message arrives within the counting period C4, and the attack is detected within the counting period C6.

Figure 19:
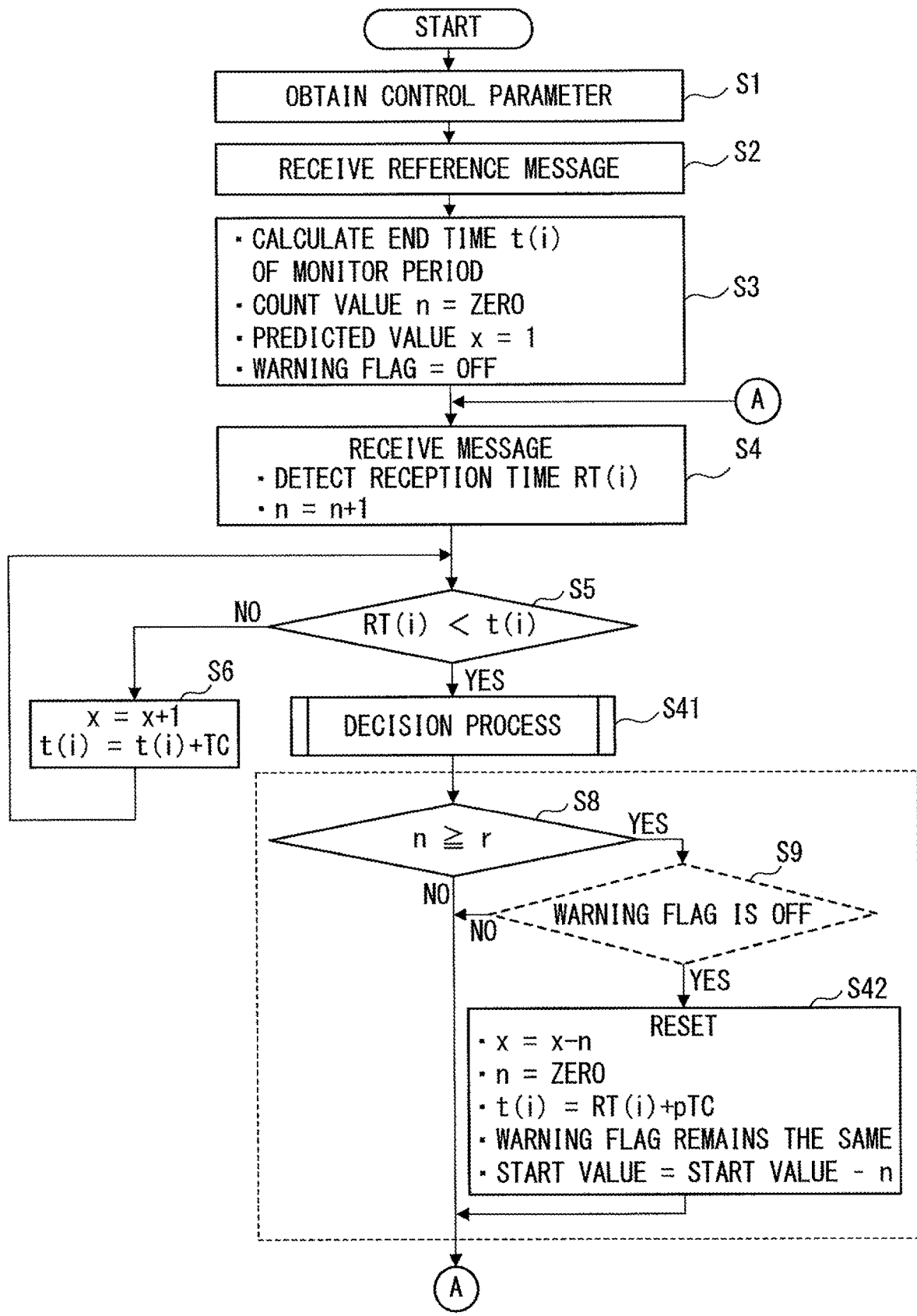
FIG. 19 is a flowchart indicating an example of an attack detection method of a second embodiment.

FIG. 19 is a flowchart indicating an example of an attack detection method of the second embodiment. For example, the process of this flowchart is performed by the attack detection device 1 when a detection target ID is specified.

The procedure of the attack detection method of the second embodiment is almost the same as the attack detection method of the first embodiment depicted in FIG. 12. In the second embodiment, however, the control parameter obtained by the attack detection device 1 in S1 includes the early-arrival acceptable value e and early-arrival grace period w described above, in addition to the transmission cycle TC, the threshold r, and the timing parameter p.

In the second embodiment, a decision process of S41 is performed instead of S7 depicted in FIG. 12. The decision process of S41 will be described hereinafter by referring to FIG. 20. In the second embodiment, in addition, a reset process of S42 is performed instead of S10 depicted in FIG. 12. In the reset process of S42, the start value s is reset in addition to resetting the predicted value x, the count value n, and the end time t(i) of a next monitor period. In the resetting, the start value s is updated to "current start value s−count value n". However, the start value s does not necessarily need to be updated in the reset process because this value is updated in S56 in FIG. 20 (this will be described hereinafter). Alternatively, the start value s may be set to the same value as the predicted value x updated in the resetting.

In the second embodiment, as described above, every time a new message arrives at the attack detection device 1, S4-S6, S41, S8-S9, and S42 are performed, and it is decided whether the network 100 has been attacked. Also in the second embodiment, the reset controller 6 may perform S11 depicted in FIG. 14 or S12 depicted in FIG. 15.

Figure 20:
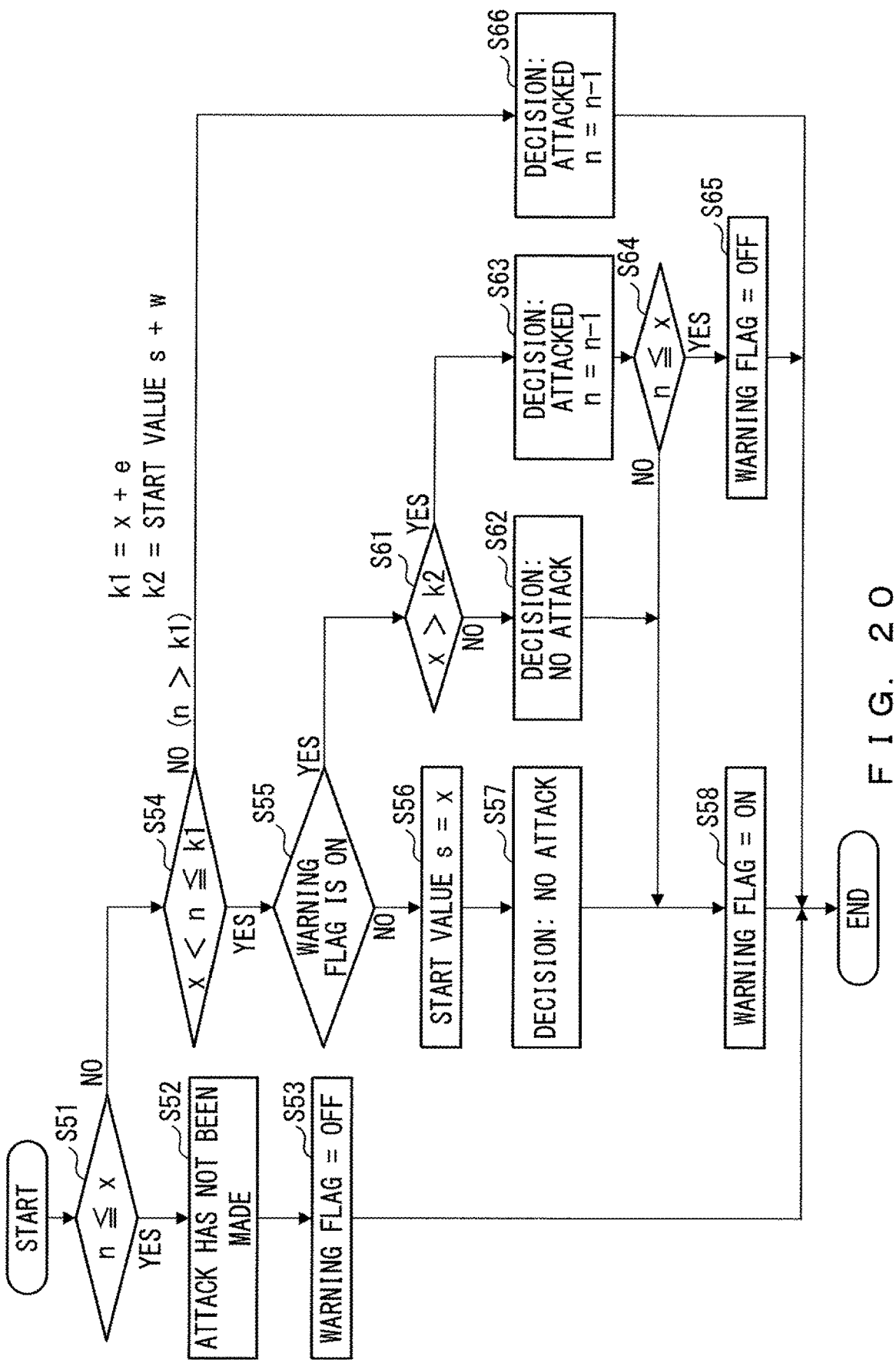
FIG. 20 is a flowchart indicating an example of a decision process of a second embodiment.

FIG. 20 is a flowchart indicating an example of a decision process of the second embodiment. This decision process corresponds to S41 depicted in FIG. 19 and is performed every time a message (a normal message or an attack message) arrives at the attack detection device 1.

In S51, the decision unit 5 compares the count value n with the predicted value x. When the count value n is equal to or smaller than the predicted value x, the decision unit 5 decides in S52 that the network 100 has not been attacked. In S53, the decision unit 5 sets the warning flag in OFF state. When the count value n is larger than the predicted value x, it is decided in S54 whether the count value x satisfies the condition "x<n≤k1". The reference value k1 is obtained by adding an early-arrival acceptable value e to the predicted value x. In this example, the early-arrival acceptable value e is an integer that is 2 or larger.

When the count value x satisfies the condition "x<n≤k1", the decision unit 5 checks the state of the warning flag in S55. When the warning flag is in OFF state, the decision unit 5 sets a start value s in S56. In this example, the same value as the predicted value x is set as the start value s. In S57, the decision unit 5 decides that the network 100 has not been attacked. In S58, the decision unit 5 sets the warning flag in ON state.

When the warning flag is in ON state (S55: Yes), the decision unit 5 decides in S61 whether the predicted value x is larger than a reference value k2. The reference value k2 is obtained by adding the early-arrival grace period w to the start value s. Accordingly, it is decided in effect in S61 whether the early-arrival grace period w has elapsed since the setting of the warning flag in ON state. When the predicted value x is equal to or smaller than the reference value k2, the decision unit 5 decides in S62 that the network 100 has not been attacked. That is to say, when the early-arrival grace period w has not elapsed since the setting of the warning flag in ON state, the decision unit 5 does not decide whether the network 100 has been attacked. In S58, the decision unit 5 sets the warning flag in ON state.

When the predicted value x is larger than the reference value k2 (S61: Yes), the decision unit 5 decides in S63 that the network 100 has been attacked. In particular, when the predicted value x is larger than the reference value k2 (i.e., when the early-arrival grace period w has elapsed since the setting of the warning flag in ON state), the decision unit 5 decides whether the network 100 has been attacked. Thus, the decision unit 5 compares the count value n with the predicted value x. Here, the count value x satisfies the condition "x<n≤k1" when S61 is performed, and the count value n is thus larger than the predicted value x. Accordingly, the decision unit 5 decides that the network 100 has been attacked. In addition, the decision unit 5 decrements the count value n by 1.

In S64, the decision unit 5 compares the count value n updated in S63 with the predicted value x. When the count value n is equal to or smaller than the predicted value x, the decision unit 5 changes the warning flag from ON state to OFF state in S65. When the count value n is larger than the predicted value x, the decision unit 5 sets the warning flag in ON state in S58.

When the count value n is larger than the reference value k1 (S54: No), the decision unit 5 decides in S66 that the network 100 has been attacked. The decision unit 5 also decrements the count value n by 1.

In the second embodiment, as described above, an early-arrival acceptable value e and an early-arrival grace period w are used to decide whether an attack has been made, so that erroneous detection can be avoided even when the number of early arriving messages is increased. In, for example, a case where e=w, as long as the number of early arriving messages is e or smaller, the attack detection device 1 does not decide that the network 100 has been attacked.

However, when a large early-arrival acceptable value e and/or an long early-arrival grace period w are set, it could take a long time to detect an attack. Hence, the early-arrival acceptable value e and the early-arrival grace period w are preferably determined in consideration of both the number of acceptable early arriving messages and a time that will need to be taken to detect an attack.

The attack detection method of the first embodiment is equivalent to the attack detection method of the second embodiment with 1 set as both an early-arrival acceptable value e and an early-arrival grace period w. Thus, the second embodiment encompasses the first embodiment. However, the first embodiment includes, as depicted in FIGS. 13 and 20, fewer process steps than the second embodiment and is thus expected to achieve fast attack detection and reduce the burden on the processor.

Third Embodiment

Figure 21:
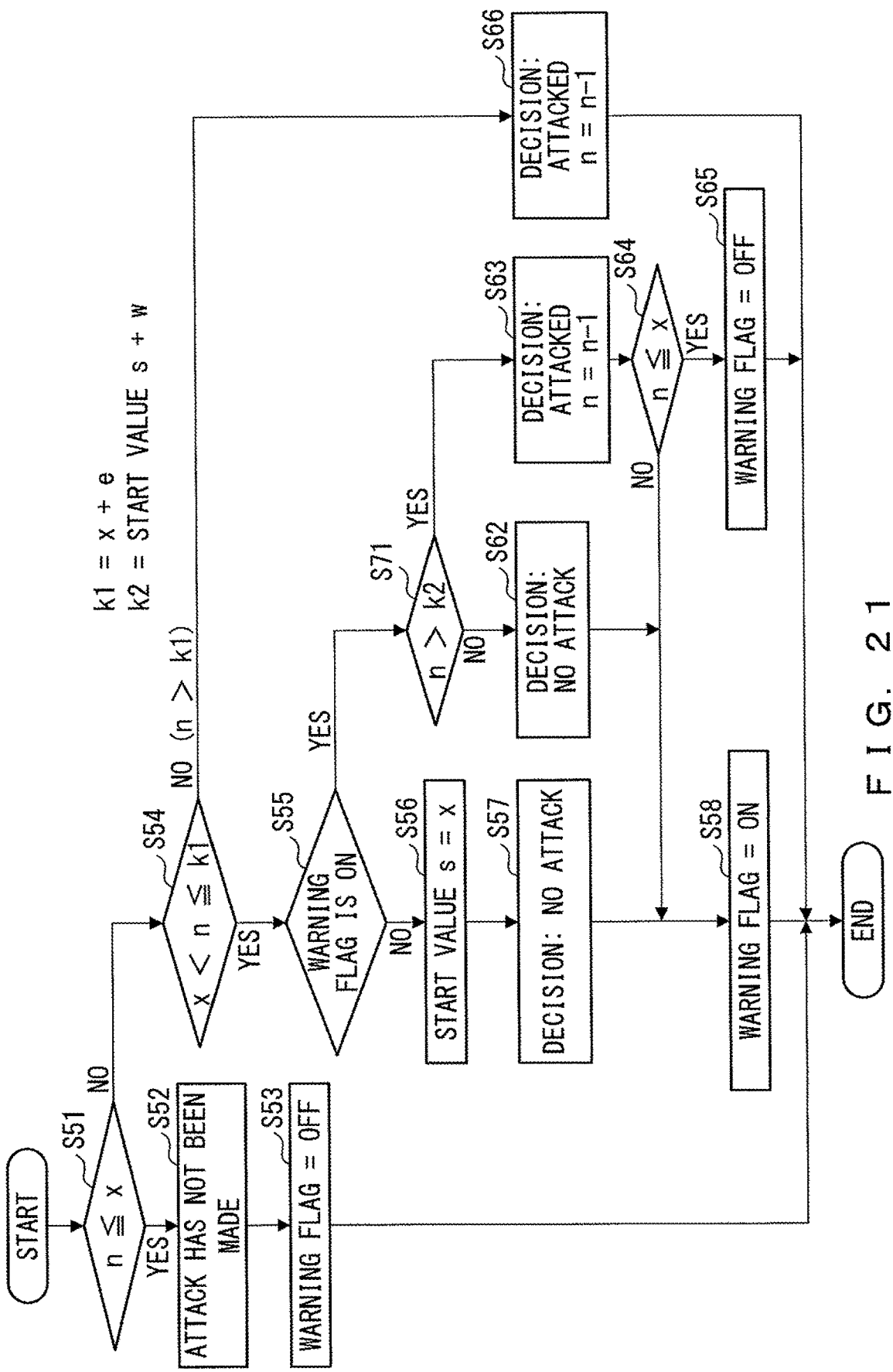
FIG. 21 is a flowchart indicating an example of a decision process of a third embodiment.

FIG. 21 is a flowchart indicating an example of a decision process of a third embodiment. This decision process corresponds to S41 depicted in FIG. 19 and is performed every time a message (a normal message or an attack message) arrives at the attack detection device 1. Thus, the attack detection method of the third embodiment is the same as that of the second embodiment except for the decision process.

The decision process of the third embodiment is almost the same as that of the second embodiment depicted in FIG. 20. In the third embodiment, however, S71 is performed instead of S61 depicted in FIG. 20.

S71 is performed when a count value n satisfies a condition "x<n≤k1" with a warning flag being in ON state. In S71, the decision unit 5 decides whether the count value n is larger than a reference value k2. The reference value k2 is obtained by adding an early-arrival grace period w to a start value s, as in the second embodiment. When the count value n is equal to or smaller than the reference value k2, the decision unit 5 decides in S62 that the network 100 has not been attacked. When the count value n is larger than the reference value k2 (S71: Yes), in S63, the decision unit 5 decides that the network 100 has been attacked and decrements the count value n by 1.

Figure 22:
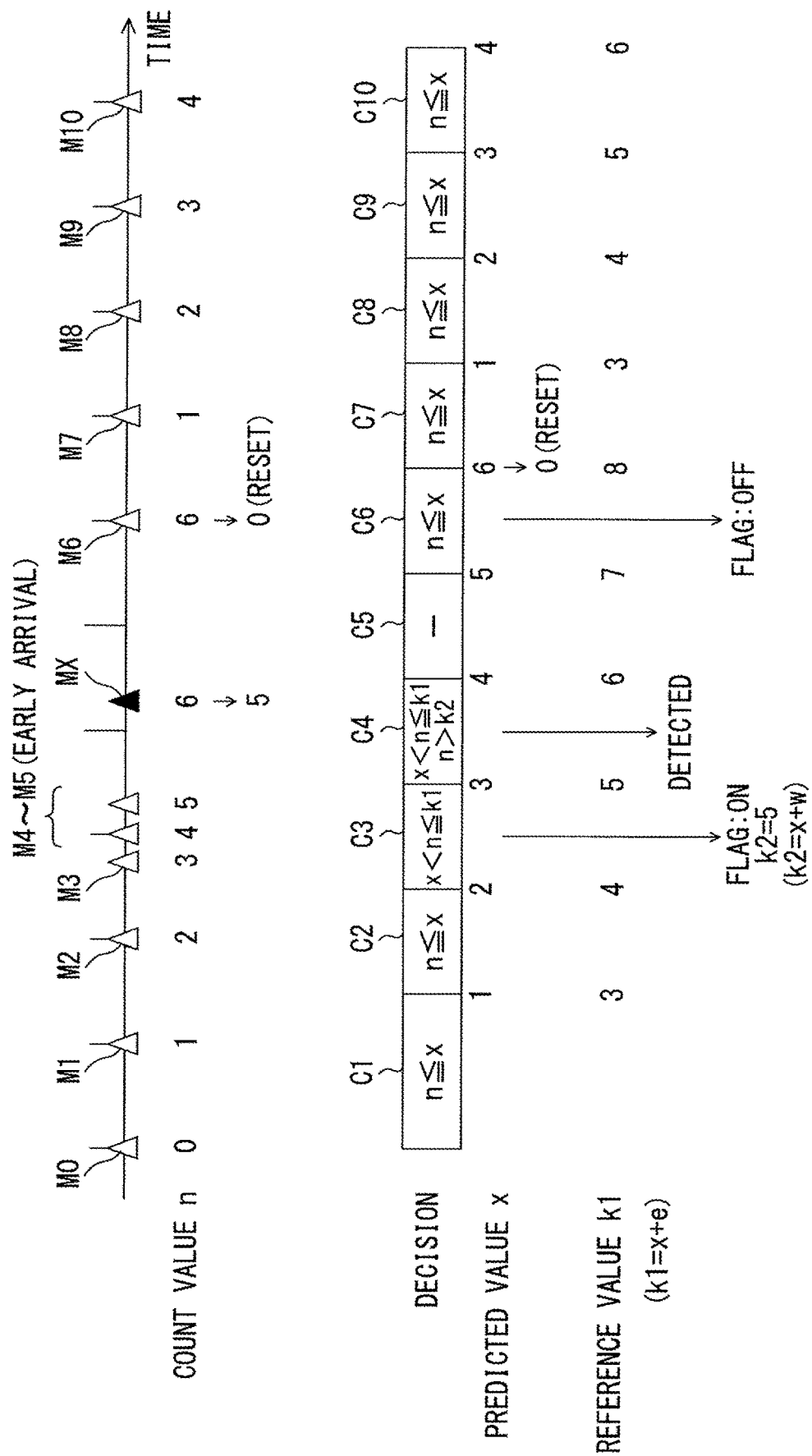
FIG. 22 illustrates an example of an operation of an attack detection method of a third embodiment.

FIG. 22 illustrates an example of an operation of an attack detection method of the third embodiment. The timings at which the messages M1-M10 and the attack message MX arrive at the attack detection device 1 in FIG. 22 are the same as those in FIG. 18.

The operations performed by the attack detection device 1 when the messages M1-M5 arrive in FIG. 22 are substantially the same as those in FIG. 18. Accordingly, the following are parameters provided when the process on the message M5 is finished.

Count value n: 5
Predicted value x: 3
Reference value k1 (k1=x+2): 5
Reference value k2 (k2="start value s"+2): 5
Warning flag: ON When the attack message MX arrives at the attack detection device 1 within a counting period C4, the count value n is incremented from 5 to 6. The predicted value x is 4 for the counting period C4, and hence the count value n is larger than the predicted value x. Accordingly, the decision unit 5 compares the count value n with the reference value k1. The reference value k1, which is obtained by adding 2 to the predicted value x, is 6. Thus, the count value n satisfies a condition "x<n≤k1".

At this moment, the warning flag is in ON state. Accordingly, the decision unit 5 compares the count value n with the reference value k2 in S71. The reference value k2 is 5 as calculated for the counting period C3. The count value n (=6) is larger than the reference value k2. In this case, the decision unit 5 decides that the network 100 has been attacked. At this moment, the count value n is decremented by 1 in S63. However, since the decremented count value n is larger than the predicted value x (S64: No), the warning flag is maintained in ON state.

When the message M6 arrives at the attack detection device 1 within a counting period C6, the count value n is incremented from 5 to 6. The predicted value x is 6 for the count value C4, and hence the count value n is equal to or smaller than the predicted value x. In this case, the decision unit 5 decides in S52 that the network 100 has not been attacked. The decision unit 5 also changes the warning frag from ON state to OFF state in S53.

In the third embodiment, as described above, when the count value n satisfies the condition "x<n≤k1" while the warning flag is in ON state, it is decided whether the network 100 has been attacked according to a comparison between the count value n and the reference value k2 (i.e., start value s+w). As a result, in the attack detection method of the third embodiment, the period of time extending from a moment at which an attack message is input to the network 100 to a moment at which the attack is detected may be shorter than that in the second embodiment. For example, an attack is detected within the counting period C6 in the second embodiment depicted in FIG. 18, while an attack is detected within the counting period C4 in the third embodiment depicted in FIG. 22.

Example 1

Figure 23:
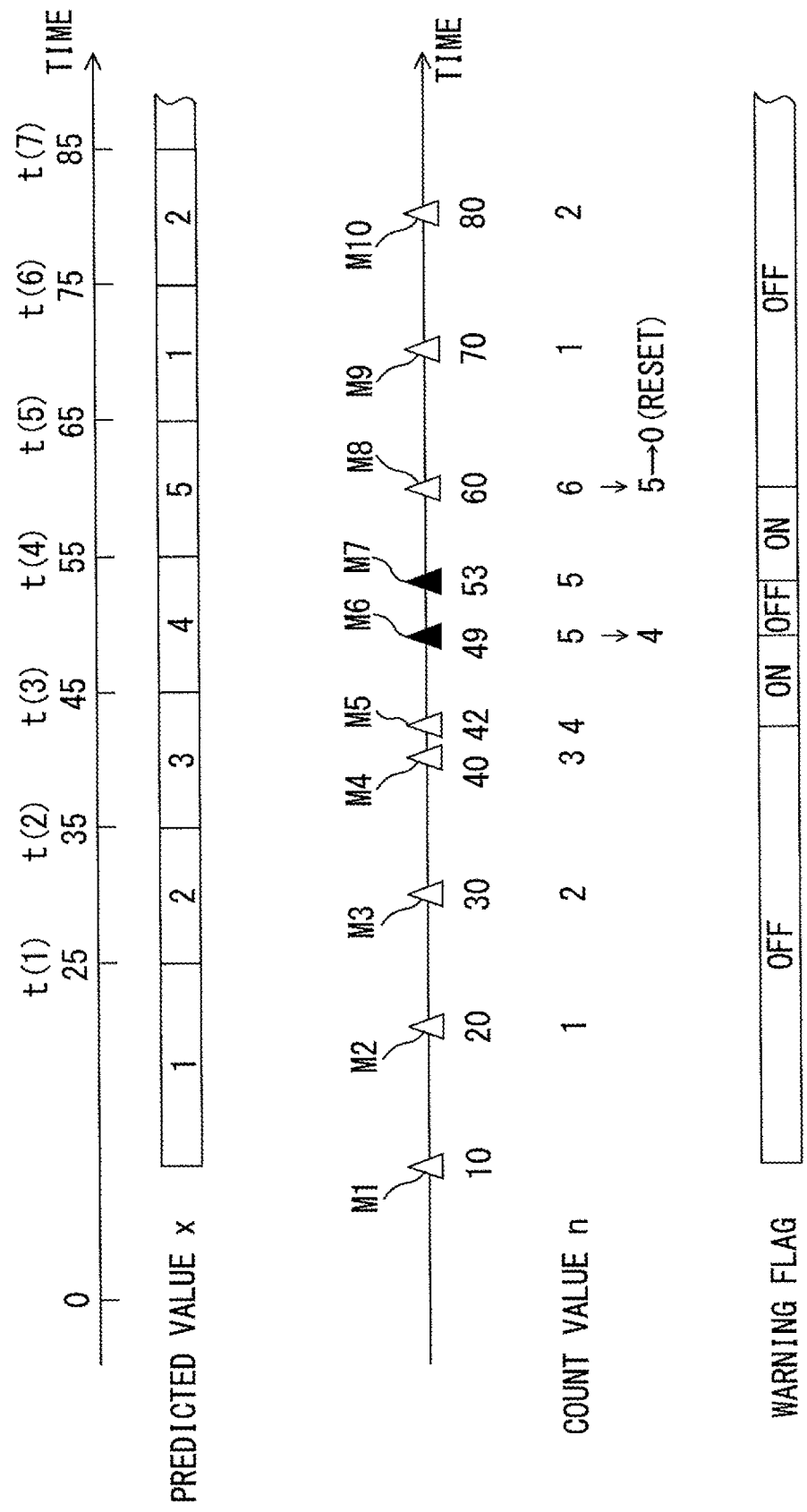

In Example 1 depicted in FIG. 23, an attack is detected in accordance with the first embodiment. In particular, every time a message arrives at the attack detection device 1, the processes of the flowcharts depicted in FIGS. 12-13 are performed. The following parameters are used in Example 1.
Transmission cycle TC: 10 milliseconds
Threshold r: 5
Timing parameter p: 0.5

Messages M1-M5 and M8-M10 are normal messages, and messages M6-M7 are attack messages. The message M5 arrives at the attack detection device 1 prior to a scheduled time.

(1) When the message M1 arrives at time 10 (=RT(1)), the attack detection device 1 starts attack detection. In particular, the attack detection device 1 sets parameters as follows.
End time t(1) of monitor period: 25 milliseconds (t(1)=RT(1)+1.5×10)
Count value n: Zero
Predicted value x: 1
Warning flag: OFF (2) When the message M2 arrives at time 20 (=RT(2)), the count value n is incremented from zero to 1. Since the message M2 arrives prior to t(1), the predicted value x is not changed. The count value n is equal to or smaller than the predicted value x, and hence the attack detection device 1 decides that the network has not been attacked. The warning flag remains in OFF state.

(3) When the message M3 arrives at time 30 (=RT(3)), the count value n is incremented from 1 to 2. The message M3 arrives after t(1). Hence, the predicted value x is updated from 1 to 2. An end time t(2) for a next monitor period is calculated in accordance with the following formula.

$$t(2)=t(1)+10=35$$

The count value n is equal to or smaller than the predicted value x. Hence, the attack detection device 1 decides that the network has not been attacked. The warning flag remains in OFF state.

(4) When the message M4 arrives at time 40 (=RT(4)), the count value n is incremented from 2 to 3. The message M4 arrives after t(2). Hence, the predicted value x is updated from 2 to 3. An end time t(3) for a next monitor period is calculated in accordance with the following formula.

$$t(3)=t(2)+10=45$$

The count value n is equal to or smaller than the predicted value x. Hence, the attack detection device 1 decides that the network has not been attacked. The warning flag remains in OFF state.

(5) When the message M5 arrives at time 42 (=RT(5)), the count value n is incremented from 3 to 4. Since the message M5 arrives prior to t(3), the predicted value x is not changed. Thus, the predicted value x is 3. Accordingly, the count value n satisfies a condition "n=x+1", and hence the warning flag is checked. Since the warning flag is in OFF state, the attack detection device 1 decides that the network has not been attacked. However, the warning flag is changed from OFF state to ON state.

(6) When the message M6 arrives at time 49 (=RT(6)), the count value n is incremented from 4 to 5. The message M6 arrives after t(3). Hence, the predicted value x is updated from 3 to 4. An end time t(4) for a next monitor period is calculated in accordance with the following formula.

$$t(4)=t(3)+10=55$$

The count value n satisfies the condition "n=x+1", and hence the warning flag is checked. Since the warning flag is in ON state, the attack detection device 1 decides that the network has been attacked. Then, the count value n is updated from 5 to 4, and the warning flag is changed from ON state to OFF state.

(7) When the message M7 arrives at time 53 (=RT(7)), the count value n is incremented from 4 to 5. Since the message M7 arrives prior to t(4), the predicted value x is not changed. Thus, the predicted value x is 4. Accordingly, the count value n satisfies the condition "n=x+1", and hence the warning flag is checked. Since the warning flag is in OFF state, the attack detection device 1 decides that the network has not been attacked. However, the warning flag is changed from OFF state to ON state.

Since the count value n has reached the threshold r, the warning flag is checked. However, since the warning flag is in ON state, the resetting is not performed.

(8) When the message M8 arrives at time 60 (=RT(8)), the count value n is incremented from 5 to 6. The message M8 arrives after t(4). Hence, the predicted value x is updated from 4 to 5. An end time t(5) for a next monitor period is calculated in accordance with the following formula.

$$t(5)=t(4)+10=65$$

The count value n satisfies the condition "n=x+1", and hence the warning flag is checked. Since the warning flag is in ON state, the attack detection device 1 decides that the network has been attacked. Then, the count value n is updated from 6 to 5, and the warning flag is changed from ON state to OFF state.

Since the count value n has reached the threshold r, the warning flag is checked. Since the warning flag is in OFF state, the resetting is performed. Thus, the count value n is updated from 5 to zero, and the predicted value x is updated from 5 to zero.

(9) When the message M9 arrives at time 70 (=RT(9)), the count value n is incremented from 0 to 1. The message M9 arrives after t(5). Hence, the predicted value x is updated from zero to 1. An end time t(6) for a next monitor period is calculated in accordance with the following formula.

$$t(6)=t(5)+10=75$$

The count value n is equal to or smaller than the predicted value x. Hence, the attack detection device 1 decides that the network has not been attacked. The warning flag remains in OFF state.

(10) When the message M10 arrives at time 80 (=RT(10)), the count value n is incremented from 1 to 2. The message M10 arrives after t(6). Hence, the predicted value x is updated from 1 to 2. An end time t(7) for a next monitor period is calculated in accordance with the following formula.

$$t(7)=t(6)+10=85$$

The count value n is equal to or smaller than the predicted value x. Hence, the attack detection device 1 decides that the network has not been attacked. The warning flag remains in OFF state.

Example 2

In Example 2 depicted in FIG. 24, an attack is detected in accordance with the second embodiment. In particular, every time a message arrives at the attack detection device 1, the processes of the flowcharts depicted in FIGS. 19-20 are performed. The following parameters are used in Example 2.

Transmission cycle TC: 10 milliseconds
Threshold r: 5
Timing parameter p: 0.5
Early-arrival acceptable value e: 2
Early-arrival grace period w: 2
Reference value k1: "predicted value x" plus "early-arrival acceptable value e"
Reference value k2: "start value s" plus "early-arrival grace period w"

A predicted value x provided when a warning flag is in OFF state with a count value n satisfying a condition "n=x+1" is used as a start value s. Messages M1-M6 and M8-M9 are normal messages, and a message M7 is an attack message. The messages M5-M6 arrive at the attack detection device 1 prior to scheduled times.

In Example 1 depicted in FIG. 23 and Example 2 depicted in FIG. 24, the same process is performed by the attack detection device 1 when the messages M1-M4 arrive. Thus, in Example 2, the processes (1)-(4) described by referring to FIG. 23 are also performed. Accordingly, the following conditions are satisfied when the process on the message M4 is finished.

Count value n: 3
Predicted value x: 3
Warning flag: OFF

In Example 2, the reference value k1 and the reference value k2 are used. The reference value k1 is obtained by adding the early-arrival acceptable value e to the predicted value x. The reference value k2 is obtained by adding the early-arrival grace period w to the start value s. In this example, the start value s is equal to the predicted value x provided when the warning flag is in OFF state with the count value n satisfying the condition "n=x+1". The early-arrival acceptable value e and the early-arrival grace period w are each 2.

(5) When the message M5 arrives at time 42 (=RT(5)), the count value n is incremented from 3 to 4. The message M5 arrives prior to t(3), and hence the predicted value x is not changed. Thus, the predicted value x is 3. Accordingly, the count value n satisfies a condition "x<n≤k1", and hence the warning flag is checked. Since the warning flag is in OFF state, the attack detection device 1 decides that the network has not been attacked. However, the start value s is recorded. The start value s is equal to the predicted value x obtained when the message M5 arrives at the attack detection device 1 (i.e., 3). Accordingly, 5 is obtained as the reference value k2 by adding the early-arrival grace period w to the start value s. In addition, the warning flag is changed from OFF state to ON state.

(6) When the message M6 arrives at time 44 (=RT(6)), the count value n is incremented from 4 to 5. The message M6 arrives prior to t(3), and hence the predicted value x is not changed. Thus, the predicted value x is 3. Accordingly, the count value n satisfies the condition "x<n≤k1", and hence the warning flag is checked. At this moment, since the warning flag is in ON state, the predicted value x and the reference value k2 are compared. In this example, the predicted value x is equal to or smaller than the reference value k2 (start value s+w). Accordingly, the attack detection device 1 decides that the network has not been attacked. The count value n has reached the threshold r, and hence the warning flag is checked. However, since the warning flag is in ON state, the resetting is not performed.

(7) When the message M7 arrives at time 53 (=RT(7)), the count value n is incremented from 5 to 6. The message M7 arrives after t(3). Hence, the predicted value x is updated from 3 to 4, and the reference value k1 is updated from 5 to 6. An end time t(4) for a next monitor period is calculated in accordance with the following formula.

$$t(4)=t(3)+10=55$$

The count value n satisfies the condition "x<n≤k1", and hence the warning flag is checked. Since the warning flag is in ON state, the predicted value x and the reference value k2 are compared. In this example, the predicted value x is equal to or smaller than the reference value k2 (start value s+w). Accordingly, the attack detection device 1 decides that the network has not been attacked. The count value n is larger than the threshold r, and hence the warning flag is checked. However, since the warning flag is in ON state, the resetting is not performed.

(8) When the message M8 arrives at time 70 (=RT(8)), the count value n is incremented from 6 to 7. The message M8 arrives after t(4). Hence, the predicted value x is updated from 4 to 5. An end time t(5) for a next monitor period is calculated in accordance with the following formula.

$$t(5)=t(4)+10=65$$

However, the arrival time of the message M8 is still after t(5). Hence, the predicted value x is updated from 5 to 6. An end time t(6) for a next monitor period is calculated in accordance with the following formula.

$$t(6)=t(5)+10=75$$

The count value n satisfies the condition "x<n≤k1", and hence the warning flag is checked. Since the warning flag is in ON state, the predicted value x and the reference value k2 are compared. The predicted value x is 6, and the reference value k2 (start value s+w) is 5. Thus, the predicted value x is larger than the reference value k2. Accordingly, the attack detection device 1 decides that the network has been attacked. Subsequently, the count value n is updated from 7 to 6. Since the updated count value n is equal to or smaller than the predicted value x, the warning flag is changed from ON state to OFF state.

The count value n is larger than the threshold r, and hence the warning flag is checked. Since the warning flag is in OFF state, the resetting is performed. In particular, the count value n is updated from 6 to zero, and the predicted value x is updated from 6 to zero. Note that the updates of the end time t(i) of a monitor period and the start value s are omitted in this example.

(9) When the message M9 arrives at time 80 (=RT(9)), the count value n is incremented from zero to 1. The message M9 arrives after t(6). Hence, the predicted value x is updated from zero to 1. An end time t(7) for a next monitor period is calculated in accordance with the following formula.

$$t(7)=t(6)+10=85$$

The count value n is equal to or smaller than the predicted value x. Accordingly, the attack detection device 1 decides that the network has not been attacked. The warning flag remains in OFF state.

As described above, in a case where the early-arrival acceptable value e and the early-arrival grace period w are each 2, even when two messages arrive prior to a scheduled time, the attack detection device 1 does not decide that the network has been attacked. When an attack message is input, the attack detection device 1 decides that the network has been attacked.

Example 3

Figure 25:
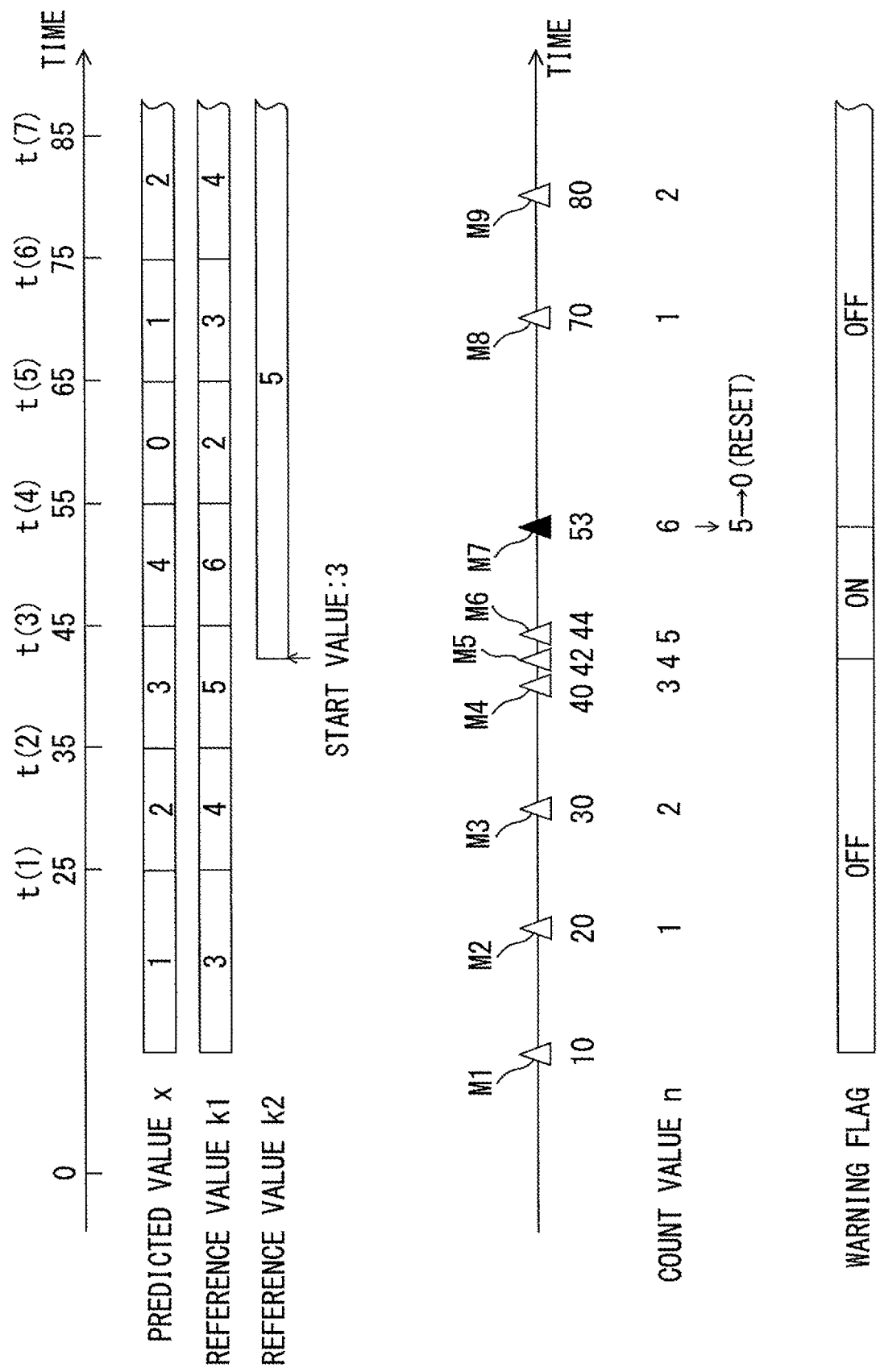

In Example 3 depicted in FIG. 25, an attack is detected in accordance with the third embodiment. In particular, every time a message arrives at the attack detection device 1, the processes of the flowcharts depicted in FIGS. 19 and 21 are performed. Parameters supplied to the attack detection device 1 in Example 3 are the same as those in Example 2. Messages M1-M9 that arrive at the attack detection device 1 in Example 3 are also the same as those in Example 2.

Processes performed by the attack detection device 1 when the messages M1-M6 arrive in Example 3 depicted in FIG. 25 are the same as those in Example 2 depicted in FIG. 24. Thus, the processes (1)-(6) described by referring to FIGS. 23-24 are also performed in Example 3. Accordingly, the following conditions are satisfied when the process on the message M6 is finished.

Count value n: 5
Predicted value x: 3
Warning flag: ON
Reference value k1: 5
Start value s: 3
Reference value k2 (start value s+w): 5

(7) When the message M7 arrives at time 53 (=RT(7)), the count value n is incremented from 5 to 6. The message M7 arrives after t(3). Hence, the predicted value x is updated from 3 to 4, and the reference value k1 is updated from 5 to 6. An end time t(4) for a next monitor period is calculated in accordance with the following formula.

$$t(4)=t(3)+10=55$$

The count value n satisfies the condition "x<n≤k1", and hence the warning flag is checked. Since the warning flag is in ON state, the count value n and the reference value k2 are compared. In this example, the count value n is 6, and the reference value k2 is 5. Thus, the count value n is larger than the reference value k2. Accordingly, the attack detection device 1 decides that the network has been attacked. Subsequently, the count value n is updated from 6 to 5. Since the updated count value n is equal to or smaller than the predicted value x, the warning flag is changed from ON state to OFF state.

The count value n is larger than the threshold r, and hence the warning flag is checked. Since the warning flag is in OFF state, the resetting is performed. In particular, the count value n is updated from 5 to zero, and the predicted value x is updated from 4 to −1. Note that the updates of the end time t(i) of a monitor period and the start value s are omitted in this example.

(8) When the message M8 arrives at time 70 (=RT(8)), the count value n is incremented from zero to 1. The message M8 arrives after t(4). Hence, the predicted value x is updated from −1 to zero. An end time t(5) for a next monitor period is calculated in accordance with the following formula.

$$t(5)=t(4)+10=65$$

However, the arrival time of the message M8 is still after t(5). Hence, the predicted value x is updated from zero to 1. An end time t(6) for a next monitor period is calculated in accordance with the following formula.

$$t(6)=t(5)+10=75$$

The count value n is equal to or smaller than the predicted value x. Accordingly, the attack detection device 1 decides that the network has not been attacked. The warning flag remains in OFF state.

(9) When the message M9 arrives at time 80 (=RT(9)), the count value n is incremented from 1 to 2. The message M9 arrives after t(6). Hence, the predicted value x is updated from 1 to 2. An end time t(7) for a next monitor period is calculated in accordance with the following formula.

$$t(7)=t(6)+10=85$$

The count value n is equal to or smaller than the predicted value x. Accordingly, the attack detection device 1 decides that the network has not been attacked. The warning flag remains in OFF state.

As described above, in comparison with Example 2, a different parameter is compared with the reference value k2 in Example 3. As a result, an attack may be detected at different timings in Examples 2 and 3.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An attack detection device comprising:
 a receiver configured to receive a massage that includes target identification information transmitted in a network; and
 a processor configured to
  predict a number of massages to be received by the receiver in a specified monitor period based on a transmission cycle corresponding to the target identification information so as to generate a predicted value,
  count a number of massages received by the receiver in the specified monitor period so as to generate a count value, and
  decide whether the network has been attacked according to the predicted value, a first reference value that is obtained by adding an early-arrival acceptable value specified in advance to the predicted value, and the count value, wherein
 when the count value is larger than the predicted value and smaller than or equal to the first reference value, the processor decides whether the network has been attacked according to a result of a comparison between the predicted value and the count value after an early-arrival grace period corresponding to the early-arrival acceptable value elapses.

2. The attack detection device according to claim 1, wherein
 the early-arrival grace period is expressed by an integer in units of the transmission cycle,
 when the count value is equal to or smaller than the predicted value, the processor sets a warning flag in OFF state,
 when the count value is larger than the predicted value and equal to or smaller than the first reference value with the warning flag being in OFF state, the processor records the predicted value as a start value and changes the warning flag from OFF state to ON state, and
 when the count value is larger than the predicted value and equal to or smaller than the first reference value with the warning flag being in ON state and the predicted value is larger than a second reference value, the second reference value being obtained by adding the early-arrival grace period to the start value, the processor decides that the network has been attacked.

3. The attack detection device according to claim 2, wherein
 when the processor decides that the network has been attacked, the processor subtracts 1 from the count value.

4. The attack detection device according to claim 3, wherein
 when the count value is larger than the predicted value and equal to or smaller than the first reference value with the warning flag being in ON state, and when the predicted value is larger than the second reference value, and when a new count value that is obtained after subtracting 1 from the count value is equal to or smaller than the predicted value, the processor changes the warning flag from ON state to OFF state.

5. The attack detection device according to claim 2, wherein
 when the count value is larger than the first reference value, the processor decides that the network has been attacked.

6. The attack detection device according to claim 1, wherein
 the early-arrival grace period is expressed in units of the transmission cycle,
 when the count value is equal to or smaller than the predicted value, the processor sets a warning flag in OFF state,
 when the count value is larger than the predicted value and equal to or smaller than the first reference value with the warning flag being in OFF state, the processor records the predicted value as a start value and changes the warning flag from OFF state to ON state, and
 when the count value is larger than the predicted value and equal to or smaller than the first reference value with the warning flag being in ON state and the count value is larger than a second reference value, the second reference value being obtained by adding the early-arrival grace period to the start value, the processor decides that the network has been attacked.

7. An attack detection device comprising:
a receiver configured to receive a massage that includes target identification information transmitted in a network; and
a processor configured to
predict a number of massages to be received by the receiver in a specified monitor period based on a transmission cycle corresponding to the target identification information so as to generate a predicted value,
count a number of messages received by the receiver in the monitor period so as to generate a count value, and
decide whether the network has been attacked according to a result of a comparison between the predicted value and the count value, wherein
when the count value is equal to or smaller than the predicted value, the processor sets a warning flag in OFF state,
when the count value is equal to a reference value with the warning flag being in OFF state, the reference value being obtained by adding 1 to the predicted value, the processor changes the warning flag from OFF state to ON state, and
when the count value is equal to the reference value with the warning flag being in ON state, the processor decides that the network has been attacked.

8. The attack detection device according to claim 7, wherein
when the processor decides that the network has been attacked, the processor subtracts 1 from the count value and changes the warning flag from ON state to OFF state.

9. The attack detection device according to claim 7, wherein
when the count value is larger than the reference value, the processor decides that the network has been attacked.

10. The attack detection device according to claim 7, wherein
when the count value is equal to or larger than a specified threshold, the processor performs a reset process of updating the count value to zero and updating the predicted value to a value obtained by subtracting the count value from the predicted value.

11. The attack detection device according to claim 10, wherein
the processor performs the reset process when the count value is equal to or larger than the threshold and a time at which the receiver receives a message falls within an acceptable range set for a targeted reception time.

12. The attack detection device according to claim 10, wherein
the processor performs the reset process when the count value is equal to or larger than the threshold and a difference in reception time between two consecutive messages received by the receiver falls within an acceptable range set for the transmission cycle.

13. A non-transitory computer-readable recording medium having stored therein a program for causing a processor to execute an attack detection process, the attack detection process comprising:
receiving, by using a receiver, a massage that includes target identification information transmitted in a network;
predicting a number of massages to be received by the receiver in a specified monitor period based on a transmission cycle corresponding to the target identification information so as to generate a predicted value;
counting a number of massages received by the receiver in the specified monitor period so as to generate a count value; and
deciding whether the network has been attacked according to the predicted value, a reference value that is obtained by adding an early-arrival acceptable value specified in advance to the predicted value, and the count value, wherein
when the count value is larger than the predicted value and equal to or smaller than the reference value, it is decided whether the network has been attacked according to a result of a comparison between the count value and the predicted value after an early-arrival grace period corresponding to the early-arrival acceptable value has elapsed.

14. A non-transitory computer-readable recording medium having stored therein a program for causing a processor to execute an attack detection process, the attack detection process comprising:
receiving, by using a receiver, a massage that includes target identification information transmitted in a network;
predicting a number of massages to be received by the receiver in a specified monitor period based on a transmission cycle corresponding to the target identification information so as to generate a predicted value;
counting a number of massages received by the receiver in the specified monitor period so as to generate a count value; and
setting a warning flag in OFF state when the count value is equal to or smaller than the predicted value;
changing the warning flag from OFF state to ON state when the count value is equal to a reference value obtained by adding 1 to the predicted value with the warning flag being in OFF state; and
deciding that the network has been attacked when the count value is equal to the reference value with the warning flag being in ON state.

* * * * *